(12) United States Patent
Nakamura et al.

(10) Patent No.: US 12,105,313 B2
(45) Date of Patent: Oct. 1, 2024

(54) LIGHTING DEVICE

(71) Applicant: Nitto Denko Corporation, Osaka (JP)

(72) Inventors: Kozo Nakamura, Osaka (JP); Yufeng Weng, Osaka (JP); Takahiro Yoshikawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/017,494

(22) PCT Filed: Jul. 16, 2021

(86) PCT No.: PCT/JP2021/026879
§ 371 (c)(1),
(2) Date: Jan. 23, 2023

(87) PCT Pub. No.: WO2022/024824
PCT Pub. Date: Feb. 3, 2022

(65) Prior Publication Data
US 2023/0358942 A1     Nov. 9, 2023

(30) Foreign Application Priority Data

Jul. 28, 2020 (JP) ................................. 2020-127344
Sep. 30, 2020 (JP) ................................. 2020-165581

(51) Int. Cl.
*G02B 6/00* (2006.01)
*F21V 8/00* (2006.01)

(52) U.S. Cl.
CPC .......... *G02B 6/0038* (2013.01); *G02B 6/0041* (2013.01); *G02B 6/0065* (2013.01); *G02B 6/0073* (2013.01)

(58) Field of Classification Search
CPC .. G02B 6/0038; G02B 6/0041; G02B 6/0065; G02B 6/0073
See application file for complete search history.

(56) References Cited

U.S. PATENT DOCUMENTS 9,244,212 B2   1/2016   Holman et al.
2002/0141201 A1*   10/2002   Shimura .............. G02B 6/0038
                                                      362/558
(Continued)

FOREIGN PATENT DOCUMENTS

EP   2 956 713   7/2018
EP   2 951 624   11/2019
(Continued)

OTHER PUBLICATIONS

International Search Report issued in International Patent Application No. PCT/JP2021/026879, dated Aug. 31, 2021.
(Continued)

*Primary Examiner* — Gerald J Sufleta, II
(74) *Attorney, Agent, or Firm* — GREENBLUM & BERNSTEIN, P.L.C.

(57) ABSTRACT

A lighting device that can ensure task productivity while reducing the glare is provided herein. The lighting device has a light source; and a light guiding part including a light guiding panel and configured to guide light that is emitted from the light source. The light guiding panel includes: a light incident end surface that is situated facing the light source, the light incident end surface being a surface on which the light emitted from the light source is incident; a first light emitting part that is included in an opposite end from the light incident end surface, and that emits the light guided inside the light guiding panel; and a second light emitting part that is included in a predetermined main surface of the light guiding panel that intersects with the light incident end surface, and that emits the light guided inside the light guiding panel.

12 Claims, 22 Drawing Sheets

(56) References Cited

U.S. PATENT DOCUMENTS

| | | | |
|---|---|---|---|
| 2010/0157619 A1* | 6/2010 | Chinniah | G02B 6/001 |
| | | | 362/551 |
| 2011/0044059 A1* | 2/2011 | Inoue | H04N 1/02835 |
| | | | 362/311.07 |
| 2012/0020066 A1* | 1/2012 | Chang | F21V 3/02 |
| | | | 362/217.05 |
| 2012/0268966 A1 | 10/2012 | McCollum et al. | |
| 2015/0036386 A1 | 2/2015 | Holman et al. | |
| 2015/0184829 A1* | 7/2015 | Baek | F21S 43/15 |
| | | | 362/346 |
| 2019/0369318 A1 | 12/2019 | Takata et al. | |
| 2020/0348462 A1 | 11/2020 | Hattori et al. | |
| 2021/0109274 A1 | 4/2021 | Rinko et al. | |

FOREIGN PATENT DOCUMENTS

| | | |
|---|---|---|
| JP | 2001-176315 | 6/2001 |
| JP | 2007-273288 | 10/2007 |
| JP | 2012-89256 | 5/2012 |
| JP | 2013-195811 | 9/2013 |
| JP | 2016-135274 | 7/2016 |
| JP | 6067791 | 1/2017 |
| JP | 2019-75352 | 5/2019 |
| JP | 2019-207834 | 12/2019 |
| WO | 2008/087593 | 7/2008 |
| WO | 2011/124765 | 10/2011 |
| WO | 2011/127187 | 10/2011 |
| WO | 2014/148729 | 9/2014 |
| WO | 2019/087118 | 5/2019 |
| WO | 2019/146628 | 8/2019 |
| WO | 2019/182091 | 9/2019 |
| WO | 2019/224705 | 11/2019 |

OTHER PUBLICATIONS

Written Opinion issued in International Patent Application No. PCT/JP2021/026879, dated Aug. 31, 2021.
Extended European Search Report issued in EP Application No. 21849447.4, dated Jul. 9, 2024.
Taiwan, Search Report issued in TW Application No. 110126956, dated Jul. 10, 2024.
Japan, Notice of Reasons for Refusal received in JP Application No. 2022-540192, dated Aug. 20, 2024.

* cited by examiner

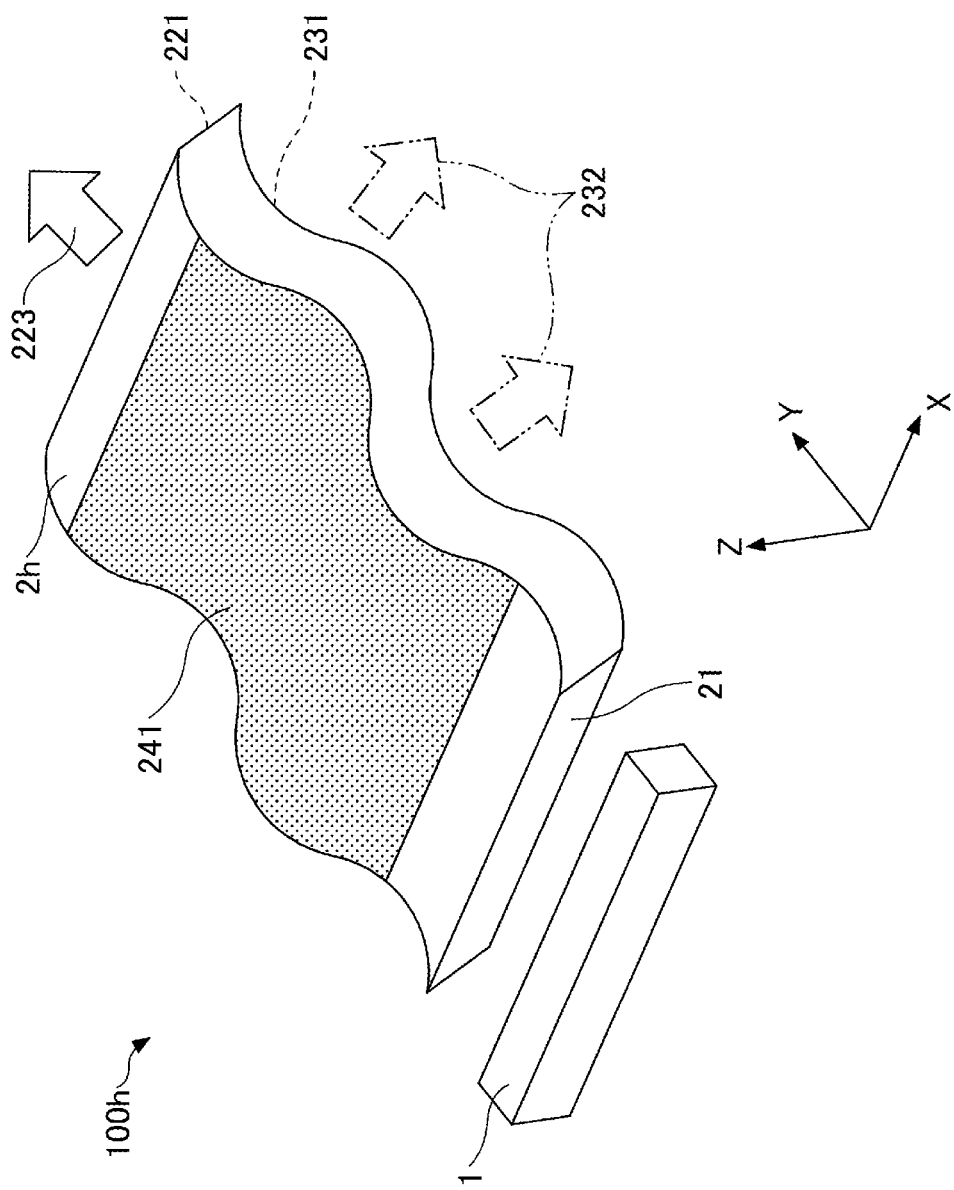

LIGHTING DEVICE

TECHNICAL FIELD

The present invention relates to a lighting device.

BACKGROUND ART

Accompanying the work style reforms of recent years, it has become important to secure a workspace where individuals can work comfortably. Also, for lighting devices that illuminate work spaces such as task lights, there is a strong demand for ones that can ensure better task productivity.

As such a lighting device, for example, a structure is disclosed that includes: a light guiding member with a light emitting surface that is substantially orthogonal to a light incident end surface facing a light source; and a prism sheet placed on the light emitting surface (see, for example, Patent Document 1). Also disclosed is a structure in which light is emitted from the tip and the peripheral surface of a cylindrical light guiding member (see, for example, Patent Document 2).

CITATION LIST

Patent Document

Patent Document 1: Japanese Patent Application Publication No. 2001-176315
Patent Document 2: Japanese Patent Application Publication No. 2016-135274

SUMMARY OF THE INVENTION

Problem to be Solved by the Invention

However, with the structures of Patent Documents 1 and 2, it may be difficult to ensure task productivity while reducing the glare.

An object of the present invention is therefore to provide a lighting device that can ensure task productivity while reducing the glare.

Means for Solving the Problem

To solve the above problem, according to the present invention, a lighting device has a light source; and a light guiding part including a light guiding panel and configured to guide light that is emitted from the light source. The light guiding panel includes: a light incident end surface that is situated facing the light source, the light incident end surface being a surface on which the light emitted from the light source is incident; a first light emitting part that is included in an opposite end from the light incident end surface, and that emits the light guided inside the light guiding panel; and a second light emitting part that is included in a predetermined main surface of the light guiding panel that intersects with the light incident end surface, and that emits the light guided inside the light guiding panel.

Advantageous Effects of the Invention

According to the present invention, it is possible to ensure task productivity while reducing the glare.

BRIEF DESCRIPTION OF THE DRAWINGS

FIG. 19 is a perspective view that illustrates an example structure of a lighting device according to a ninth embodiment.

EMBODIMENTS FOR CARRYING OUT THE INVENTION

Figure 1A:
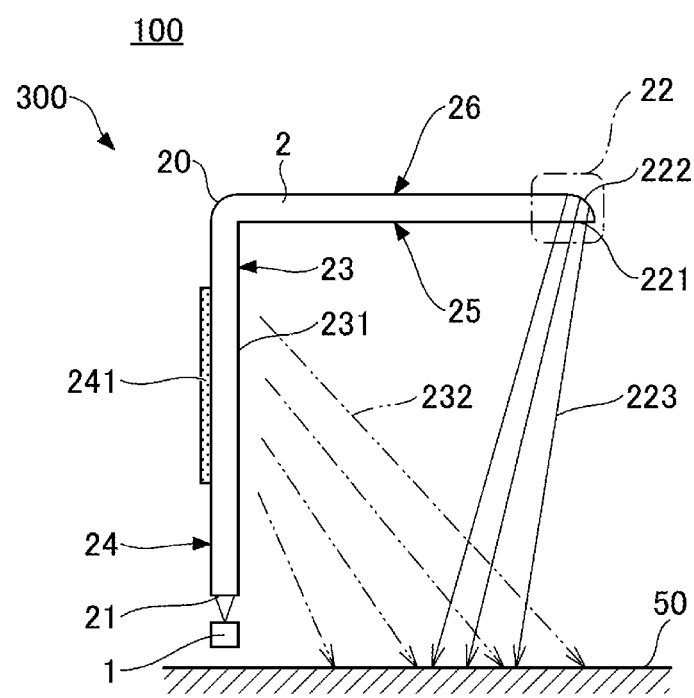
FIG. 1A is a side view that illustrates an example overall structure of a desktop lighting device according to a first embodiment.
Figure 1A:
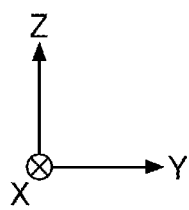

Now, embodiments of the present invention will be described below with reference to the accompanying drawings. Note that, in each drawing that follows, the same components will be assigned the same reference numerals, and redundant description will be omitted as appropriate. Furthermore, the embodiments illustrated below are simply examples of lighting devices that embody the technical concept of the present invention, and the present invention is by no means limited to the embodiments illustrated below. The dimensions, materials, shapes, relative arrangements, and the like of the components described below are intended to illustrate, rather than limit, the scope of the present invention unless specifically stated otherwise. Also, the sizes and positional relationships of members illustrated in the drawings may be exaggerated for ease and clarity of explanation.

A lighting device according to an embodiment has: a light source; and a light guiding part that includes a light guiding panel and guides the light emitted from the light source; and the light emitted from the light source enters the inside of the light guiding panel through a light incident end surface that faces the light source. Furthermore, the light guided inside the light guiding panel exits from both a first light emitting part that is included in the opposite end from the light incident end surface and a second light emitting part that is included in a main surface of the light guiding panel that intersects with the light incident end surface.

The application of this lighting device, the place of installation, and what to illuminate are not particularly limited. For example, this lighting device may be installed on a desk or in the vicinity of a desk (including the wall surface and the ceiling of the room) and used as a desktop lighting device that illuminates the desk. Also, the lighting device can be used as a ceiling light by installing it on the ceiling. Also, the lighting device can be installed on the sidewall of a passageway and used as a footlight to illuminate the floor surface. Also, the lighting device can be used for indirect lighting for illuminating the sidewalls and ceiling.

For example, when the lighting device is used as a desk light, the light that is emitted from the first light emitting part illuminates the hand of the worker, and the light emitted from the second light emitting part illuminates the work desk over a wide range, thereby providing sufficient light illuminance for ensuring task productivity while reducing the glare.

Here, the light guiding panel refers to a plate-like member that includes a flat portion or a curved portion. Also, a main surface as used herein refers to a flat surface or a curved surface that intersects with the thickness direction of the plate-like member. A plurality of flat surfaces or curved surfaces may be combined and form one main surface. An end surface refers to a side surface at each end of the plate-like member, that is, a surface that intersects with a main surface. An end refers to each end portion of the plate-like member, that is, a portion that includes an end surface and an area in the main surface near the end surface.

For example, the light that is emitted from the first light emitting part can serve as a spot light to illuminate the worker's hand. A "spot light" as used herein refers to a light that is prepared so as to illuminate a predetermined place in a focused fashion, but the term "spot light/spot lighting" as used in the following embodiments means that the light that is emitted from the first light emitting part illuminates a given place in a more focused manner than the light emitted from the second light emitting part.

Now, embodiments will be described below using a desktop lighting device that is installed on a work desk and illuminates the work desk as an example lighting device. Throughout the following description, for ease of explanation, the width direction of the desktop lighting device 10 when viewing the desktop lighting device 10 from the front side is the X-axis direction, the depth direction is the Y-axis direction, and the height direction is the Z-axis direction.

First Embodiment

<Example Overall Structure of the Desktop Lighting Device 100>

Figure 1B:
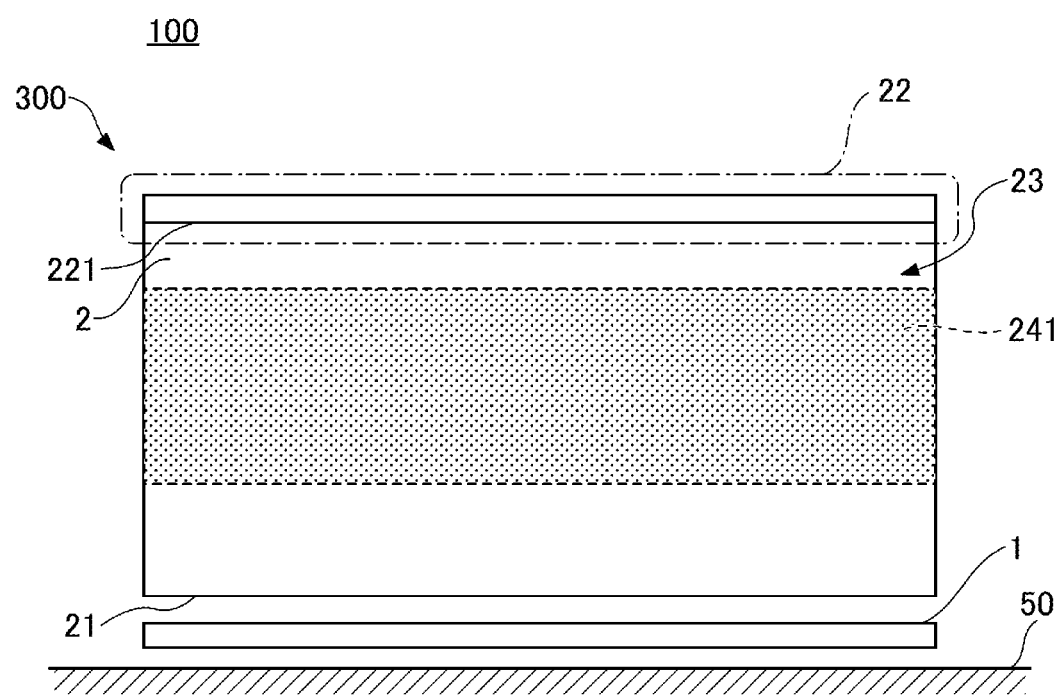
FIG. 1B is a front view that illustrates an example overall structure of the desktop lighting device according to the first embodiment.

FIG. 1A and FIG. 1B are diagrams that illustrate an example overall structure of a desktop lighting device 100 according to a first embodiment, where FIG. 1A is a side view, and FIG. 1B is a front view. The desktop lighting device 100 is placed on a work desk surface 50, which is a work space, and illuminates the work desk surface 50.

As illustrated in FIG. 1A and FIG. 1B, the desktop lighting device 100 has a light source 1 and a light guiding part 300. The light guiding part 300 includes a light guiding panel 2, and guides the light emitted from the light source 1. Light that is emitted from the light source 1 enters the inside of the light guiding panel 2, is guided inside the light guiding panel 2, and exits the light guiding panel 2, and the desktop lighting device 100 illuminates the work desk surface 50 with this light. The light source 1 is housed inside a support, and the light guiding panel 2 is supported by the support while maintaining a predetermined position and orientation with respect to the light source 1.

The light source 1 is formed by arranging a plurality of LEDs (Light Emitting Diodes) in a line in the X-axis direction. A drive circuit supplies drive voltages, so that each LED emits light. The light source 1 can emit, in the positive Z-axis direction, linear light that is formed by lights emitted from respective LEDs and extends in the X-axis direction. The light emitted by the light source 1 is preferably white light for work, but may be monochromatic light as well. In addition, it is possible to choose various types of white light, such as incandescent white, daylight white, daylight color, and so forth. The type of the light source is not limited to LEDs either, and, for example, linear light sources such as a fluorescent lamp, a cold cathode tube, and the like, or a plurality of optical fibers bundled in a line may be used as well.

The light guiding panel 2 is a plate-like member in which a transparent flat plate that is transparent to visible light is bent at a bent part 20. Note that a "bent part" refers to part that is bent and curved. As illustrated in FIG. 1A, the light guiding panel 2 has a bent shape in side view. Also, as illustrated in FIG. 1B, the light guiding panel 2 has a rectangular shape in plan view. Preferably, the visible-light transmittance of the light guiding panel 2 is 60% or more, 65% or more, 70% or more, 75% or more, 80% or more, 85% or more, or 90% or more. The transmittance of visible light is specified as the average value of transmittance at each wavelength, measured by using a spectrophotometer at a measurement wavelength of 380 nm or more and 780 nm or less.

This light guiding panel 2 can be manufactured by molding a resin material. Examples of the resin material include PMMA (polymethyl methacrylate). However, since the refractive index, the strength, the moisture resistance, and so forth of the light guiding panel 2 might vary depending on the resin material, it is preferable not to limit the resin material to PMMA, and it is more preferable to choose the material as appropriate according to, for example, the environment in which the lighting device is used, the condition of use, and so forth. Also, the light guiding panel 2 can be formed by including a glass material. Colored materials may also be used as long as they are transparent to visible light. As for the method of processing, resin molding is by no means a limitation, and bending, cutting, and so forth can be used as well.

As illustrated in FIG. 1A and FIG. 1B, the light guiding panel 2 has a light incident end surface 21, which faces the light source 1, and through which the light emitted from the light source 1 enters the inside of the light guiding panel 2. Also, the light guiding panel 2 has a first light emitting part 221, which emits the light guided inside the light guiding panel 2. The first light emitting part 221 is included in the opposite end 22 (the one-dot-dashed line portion) of the light incident end surface 21. This "opposite end from the light incident end surface" refers simply to the end that is situated opposite the light incident end surface assuming that the light guiding panel 2 is flat. In the event there is a bent part 20 as in the light guiding panel 2, the "opposite end from the light incident end surface" means the other end situated over the bent part 20.

Also, the light guiding panel 2 has a second light emitting part 231 that emits the light guided inside the light guiding panel 2. The second light emitting part 231 is included in a first main surface 23 (an example of a predetermined main surface) of the light guiding panel 2 that intersects with the light incident end surface 21. Furthermore, the light guiding panel 2 is provided with a light extracting part 241 that allows the light guided inside the light guiding panel 2 to exit from the second light emitting part 231. The light extracting part 241 is provided in at least part of the second main surface 24 (an example of an opposite main surface) that is situated opposite the first main surface 23.

The first main surface 23 refers to the positive Y-direction side among the flat portions of the light guiding panel 2, and the second main surface 24 refers to the negative Y-direction side among the flat portions of the light guiding panel 2. Furthermore, the light guiding panel 2 has a third main surface 25 and a fourth main surface 26. The third main surface 25 refers to the negative Z-direction side among the flat portions of the light guiding panel 2, and the fourth main surface 26 refers to the positive Z-direction side among the flat portions of the light guiding panel 2.

As illustrated in FIG. 1B, each of the light incident end surface 21, the first light emitting part 221, the second light emitting part 231, and the light extracting part 241 is a portion to cover the entire light guiding panel 2 in the X-axis direction, but this is by no means limiting, and each of the light incident end surface 21, the first light emitting part 221, the second light emitting part 231, and the light extracting part 241 may be part of the light guiding panel 2 in the X-axis direction.

Referring to FIG. 1A and FIG. 1B, light that is emitted from the light source 1 in the positive Z-axis direction enters the inside of the light guiding panel 2 through the light incident end surface 21, undergoes repeated total reflections between the first main surface 23 and the second main surface 24, and is guided inside the light guiding panel 2 in the positive Z-axis direction. Subsequently, as the direction in which the light is guided changes at the bent part 20, the light is guided inside the light guiding panel 2 in the positive Y-axis direction through repeated total reflections between the third main surface 25 and the fourth main surface 26.

Then, the light guided inside the light guiding panel 2 is redirected in the negative Z direction at the slanted part 222 included in the end 22, and exits the light guiding panel 2 through the first light emitting part 221. In the examples of FIG. 1A and FIG. 1B, the first light emitting part 221 corresponds to the area in the third main surface 25 through which the light exiting from the light guiding panel 2 passes within the third main surface 25. Light that is incident on the third main surface 25 at an angle equal to or greater than the critical angle exits the light guiding panel 2 through the first light emitting part 221. The light 223 (solid arrows) emitted from the first light emitting part 221 illuminates the work desk surface 50.

The light that is emitted from the first light emitting part 221 includes a lot of specular reflection components that have gone through total reflections inside the light guiding panel 2, and therefore has high directivity and high illuminance. Consequently, the light functions as a spotlight that illuminates a narrow range in the Y-axis direction, corresponding to the worker's hand on the work desk surface 50, with high illuminance. Note that, in the X-axis direction, it is possible to illuminate over a wide range that is equal to or longer than the length of the light guiding panel 2 in the X-axis direction, by adjusting the light extraction mechanism (the shape of the end 22) of the first light emitting part 221.

Here, the slanted part 222 is the portion that is slanted with respect to the first main surface 23. However, instead of the slanted part 222, a curved part having a curved surface may be provided as well. Note that, depending on the area of the slanted part 222, the angle of inclination, the radius of curvature of the curved surface, and so forth, more light is emitted in directions other than the direction of the work desk surface 50, and the efficiency of lighting on the work desk surface 50 might decline. Given this, it is preferable to choose the area of the slanted part 222, the angle of inclination, the radius of curvature of the curved surface, and so forth, according to, for example, the thickness of the light guiding panel 2 and the illumination range of spot lighting, such that more light is emitted in the direction of the work desk surface 50. Note that it is equally possible to form a light deflecting surface such as a reflecting surface on the surface of the slanted part 222.

Meanwhile, part of the light entering the light incident end surface 21 and guided in the positive Z-axis direction inside the light guiding panel 2 through repeated total reflections between the first main surface 23 and the second main surface 24 is reflected, scattered, refracted or diffracted by the light extracting part 241 and guided to the second light emitting part 231, and exits the light guiding panel 2 through the second light emitting part 231. The light 232 (the two-dot-dashed line arrows) emitted from the second light emitting part 231 illuminates the work desk surface 50.

In the example of FIG. 1A and FIG. 1B, the second light emitting part 231 corresponds to an area in the first main surface 23 where the light to be emitted from the light guiding panel 2 passes. FIG. 1B shows a plan view of the light extracting part 241, but this light extracting part 241 and the second light emitting part 231 occupy substantially equal areas. Note that the details of the light extracting part 241 will be described later with reference to FIG. 4A to FIG. 10B.

The light that is emitted from the second light emitting part 231 is light that is reflected, scattered, refracted or diffracted over a large area in the light guiding panel 2. For example, the light that is emitted from the second light emitting part 231 has lower directivity and lower illuminance than the light that is emitted from the first light emitting part 221. In this case, the work desk surface 50 can be illuminated over a wide range with gentle light of low illuminance. Note that, in the X-axis direction, the light that is emitted from the second light emitting part 231 can illuminate over a wide range that is greater than or equal to the length of the light guiding panel 2 in the X-axis direction.

Thus, the desktop lighting device 100 can illuminate the hand of the worker on the work desk surface 50 with the light that is emitted from the first light emitting part 221, and illuminate the work desk surface 50 over a wide range with the light emitted from the second light emitting part 231.

Here, the light guiding panel 2, the first light emitting part 221, and the light extracting part 241 in the desktop lighting device 100 are not limited to the structures illustrated in FIG. 1A and FIG. 1B, and a variety of structures can be applied. Examples of these structures will be described below.

<Example Structures of Each Part>
(Light Guiding Panel, First Light Emitting Part)

Figure 2A:
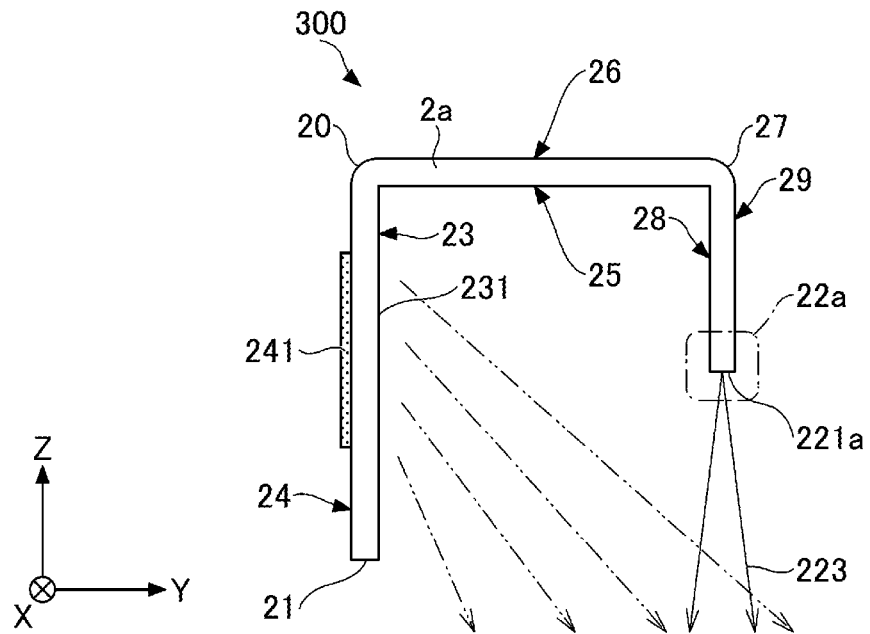
FIG. 2A is a diagram that illustrates a first example structure of a light guiding panel and a first light emitting part.
Figure 2B:
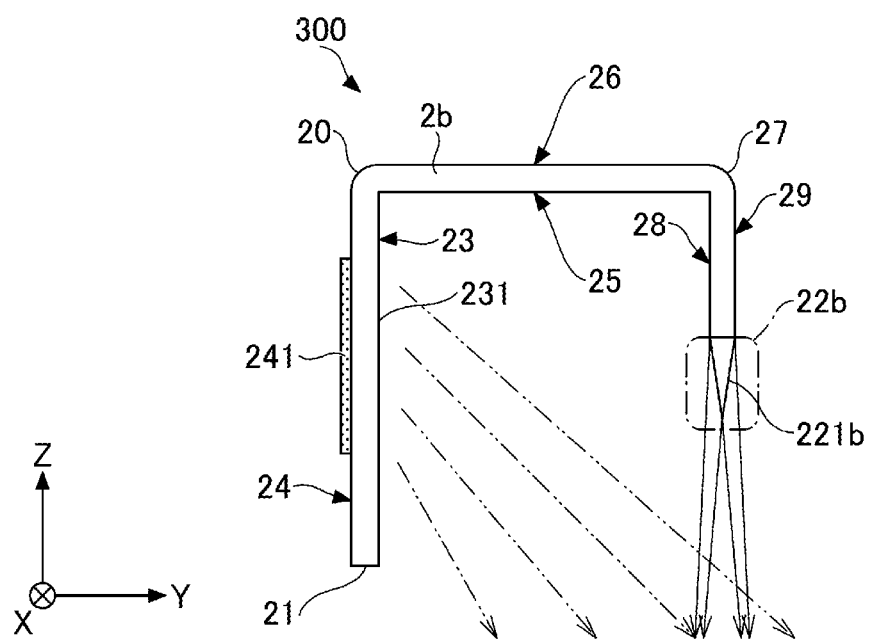
FIG. 2B is a diagram that illustrates a second example structure of the light guiding panel and the first light emitting part.

FIG. 2A and FIG. 2B are diagrams that explain example structures of the light guiding panel and the first light emitting part, where FIG. 2A is a diagram that illustrates a first example, and FIG. 2B is a diagram that illustrates a second example. The first and second examples are, respectively, modifications of the light guiding panel 2 and the first light emitting part 221 illustrated in FIG. 1A and FIG. 1B. Note that, in FIG. 2A and FIG. 2B, the front view of the light guiding panel is substantially the same as in FIG. 1A and FIG. 1B, and therefore the illustration is omitted for ease of explanation, and the light guiding panel is shown only in side views. This point holds the same whenever hereinafter the light guiding panel is illustrated only in side views.

The light guiding panel 2a illustrated in FIG. 2A has a bent part 20 and a bent part 27. The light guiding panel 2a also has a first light emitting part 221a through which the light guided inside the light guiding panel 2a exits. The first light emitting part 221a is an end surface that is included in the opposite end 22 (the one-dot-dashed line portion) of the light incident end surface 21 and that is substantially orthogonal to the fifth main surface 28 and the sixth main surface 29.

In FIG. 2A, the light emitted from the light source in the positive Z-axis direction enters the inside of the light guiding panel 2a through the light incident end surface 21, and is guided in the positive Z-axis direction inside the light guiding panel 2a through repeated total reflections between the first main surface 23 and the second main surface 24. Subsequently, the direction in which the light is guided is changed at the bent part 20, and the light is guided in the positive Y-axis direction inside the light guiding panel 2a through repeated total reflections between the third main surface 25 and the fourth main surface 26. Furthermore, the direction in which the light is guided is changed at the bent part 27, and the light is guided in the negative Z-axis direction inside the light guiding panel 2a through repeated total reflections between the fifth main surface 28 and the sixth main surface 29.

Then, the light guided inside the light guiding panel 2a exits the light guiding panel 2a through the first light emitting part 221a. The light 223 emitted from the first light emitting part 221a illuminates the work desk surface 50.

On the other hand, the light guiding panel 2b illustrated in FIG. 2B has a bent part 20 and a bent part 27. The light guiding panel 2b also has a first light emitting part 221b through which the light guided inside the light guiding panel 2b exits. The first light emitting part 221b is included in the opposite end 22 (the one-dot-dashed line portion) of the light incident end surface 21, and has a tapered shape in which the plate's thickness (the thickness in the Y-axis direction) becomes thinner in the negative Z-axis direction.

Since the behavior until the light emitted from the light source reaches the end 22 is the same as described above, the description thereof is omitted here.

The light guided inside the light guiding panel 2b exits the light guiding panel 2b through the first light emitting part 221b. The light 223 emitted from the first light emitting part 221b illuminates the work desk surface 50.

With the light guiding panel 2b, it is possible to change the spread of emitted light by choosing the taper angle of the tapered shape, and change the size of the area on the work desk surface 50 where the light illuminates, in the Y-axis direction.

Figure 3A:
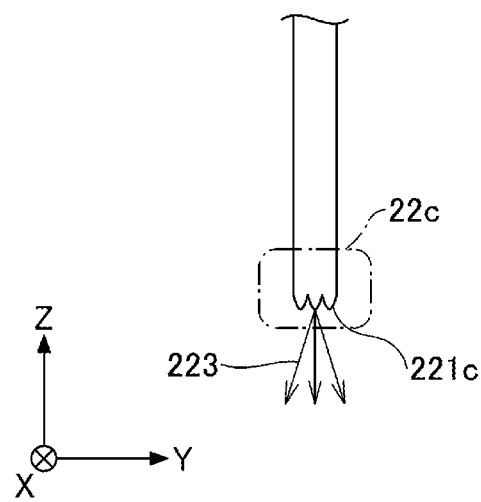
FIG. 3A is a diagram that illustrates a first example modification of the first light emitting part.
Figure 3B:
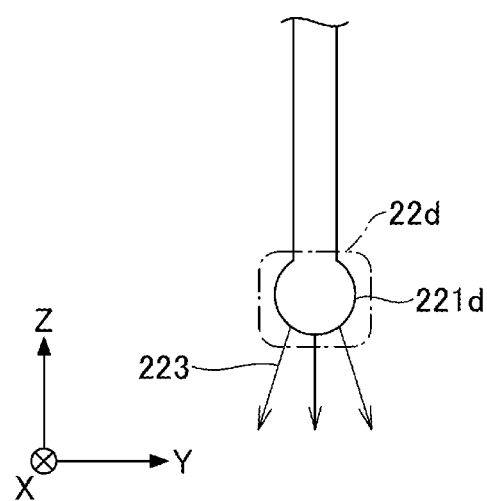
FIG. 3B is a diagram that illustrates a second example modification of the first light emitting part.

Next, FIG. 3A and FIG. 3B are diagrams that explain modifications of the first light emitting part, where FIG. 3A is a diagram that illustrates a first example, and FIG. 3B is a diagram that illustrates a second example. FIG. 3A and FIG. 3B are enlarged views of the vicinity of the opposite end from the light incident end surface.

The end 22c illustrated in FIG. 3A includes a jagged shape 221c for scattering light. The jagged shape 221c functions as a first light emitting part that scatters the light guided inside the light guiding panel, and allows this light to exit from the inside of the light guiding panel. Note that the jagged shape 221c is formed over the entire end 22c in the X-axis direction.

Also, the end 22d illustrated in FIG. 3B includes a spherical part 221d that is formed like a sphere. The spherical part 221d functions as a first light emitting part that allows the light guided inside the light guiding panel to exit from the inside of the light guiding panel. Note that a plurality of spherical parts 221d are formed at predetermined intervals over the entirety of the end 22d in the X-axis direction.

As described above, according to the present embodiment, various structures of the light guiding panel and the first light emitting part are applicable. Note that, although example structures have been illustrated with FIG. 2A and FIG. 2B, in which the fifth main surface 28 and the sixth main surface 29 are substantially parallel with the first main surface 23 and the second main surface 24, it is equally possible to employ a structure in which the fifth main surface 28 and the sixth main surface 29 are slanted with respect to the first main surface 23 and the second main surface 24. Also, although example structures have been illustrated above in which the light guiding panel has two bent parts, there may be three or more bent parts. Furthermore, although example structures have been illustrated with FIG. 1A to FIG. 2B in which the third main surface 25 and the fourth main surface 26 are substantially orthogonal to the first main surface 23 and the second main surface 24, it is equally possible to employ a structure in which the third main surface 25 and the fourth main surface 26 are slanted with respect to the first main surface 23 and the second main surface 24. Also, although examples of light guiding panels with bent parts have been illustrated FIG. 1A to FIG. 2B, it is equally possible to employ a structure with a curved part in which a flat part bends gently.

(Example Structures of Light Extracting Part)

Figure 4A:
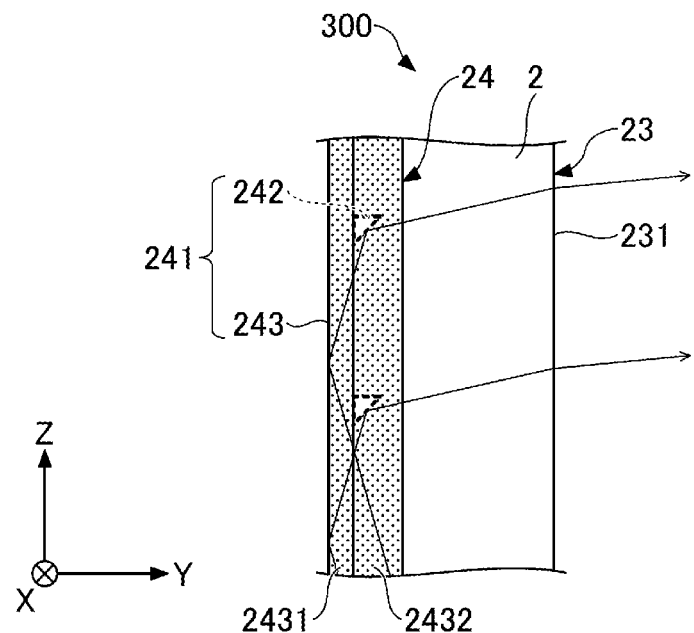
FIG. 4A is a diagram that illustrates a first example structure of a light extracting part.
Figure 4B:
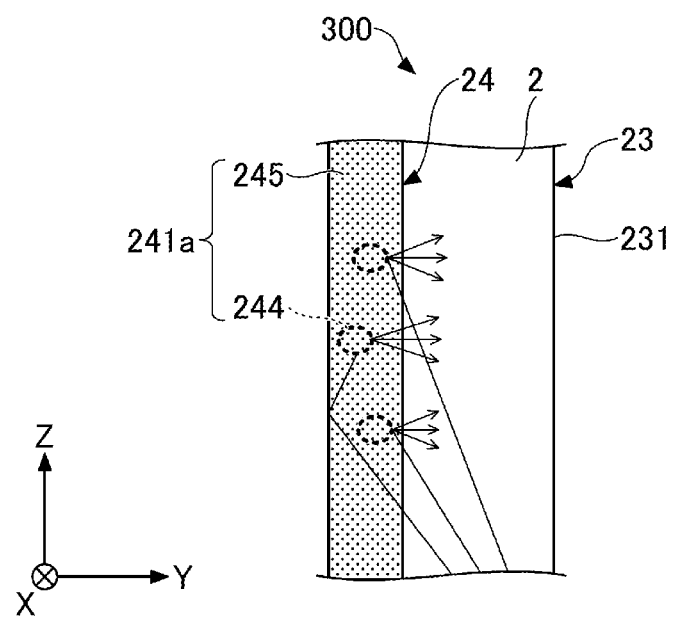
FIG. 4B is a diagram that illustrates a second example structure of the light extracting part.
Figure 5A:
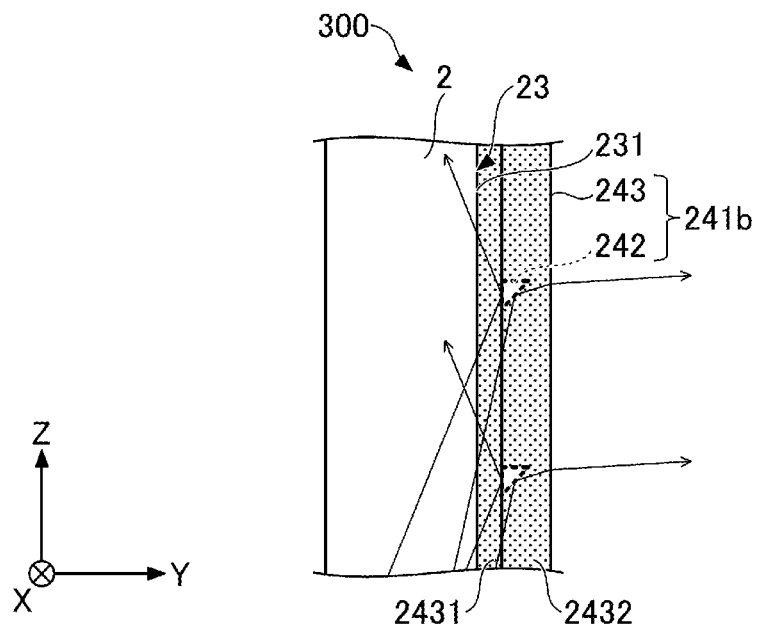
FIG. 5A is a diagram that illustrates a third example structure of the light extracting part.
Figure 5B:
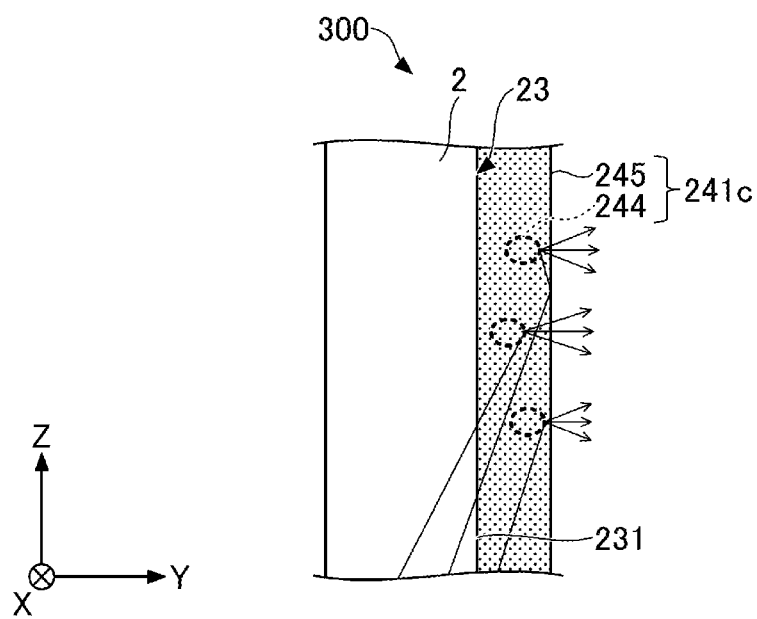
FIG. 5B is a diagram that illustrates a fourth example structure of the light extracting part.
Figure 6A:
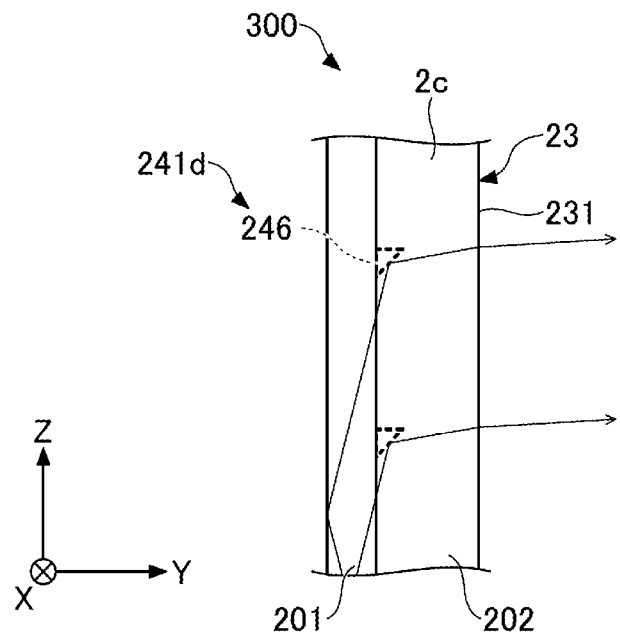
FIG. 6A is a diagram that illustrates a fifth example structure of the light extracting part.
Figure 6B:
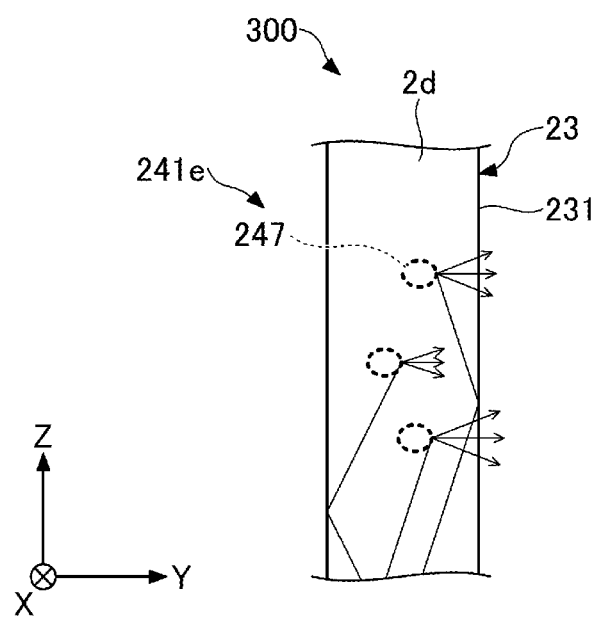
FIG. 6B is a diagram that illustrates a sixth example structure of the light extracting part.
Figure 7A:
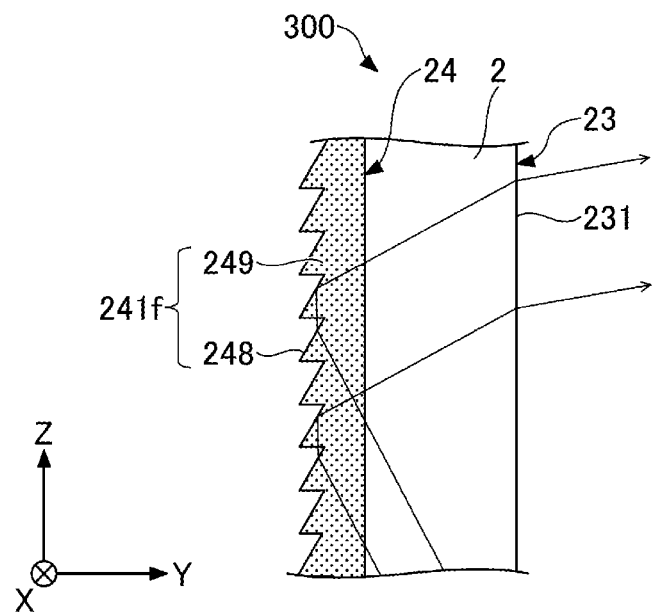
FIG. 7A is a diagram that illustrates a seventh example structure of the light extracting part.
Figure 7B:
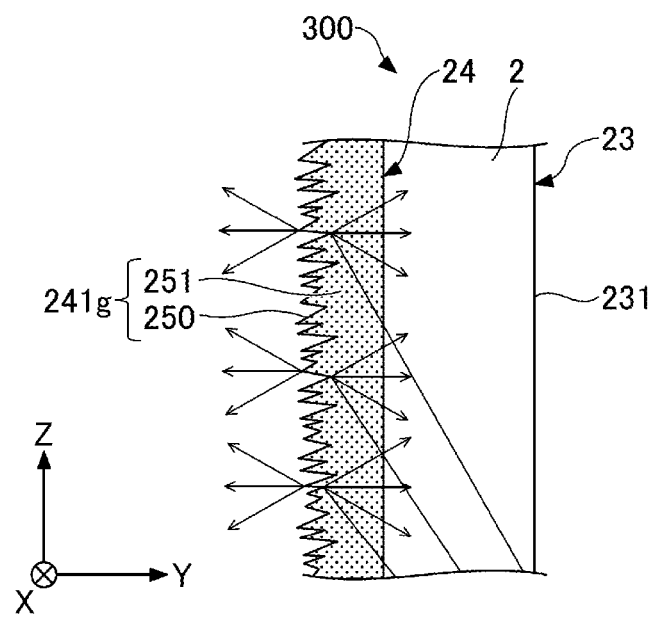
FIG. 7B is a diagram that illustrates an eighth example structure of the light extracting part.
Figure 8A:
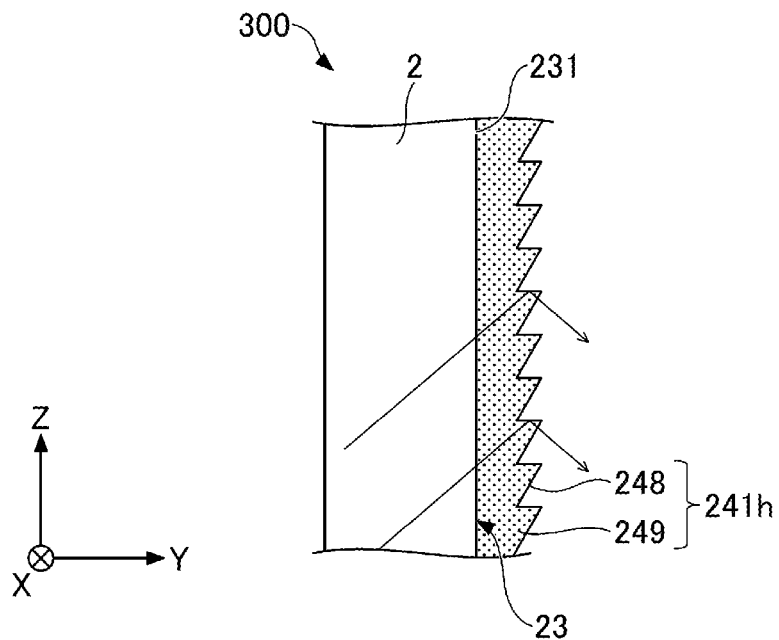
FIG. 8A is a diagram that illustrates a ninth example structure of the light extracting part.
Figure 8B:
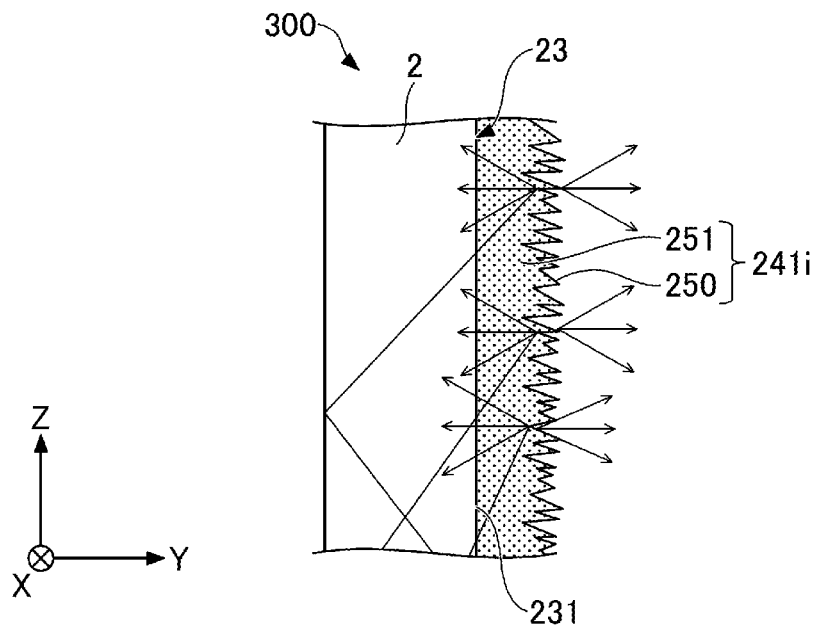
FIG. 8B is a diagram that illustrates a tenth example structure of the light extracting part.
Figure 9A:
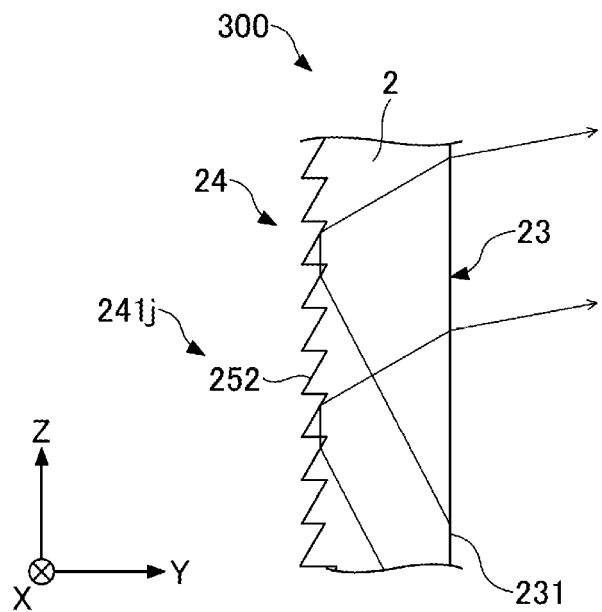
FIG. 9A is a diagram that illustrates an eleventh example structure of the light extracting part.
Figure 9B:
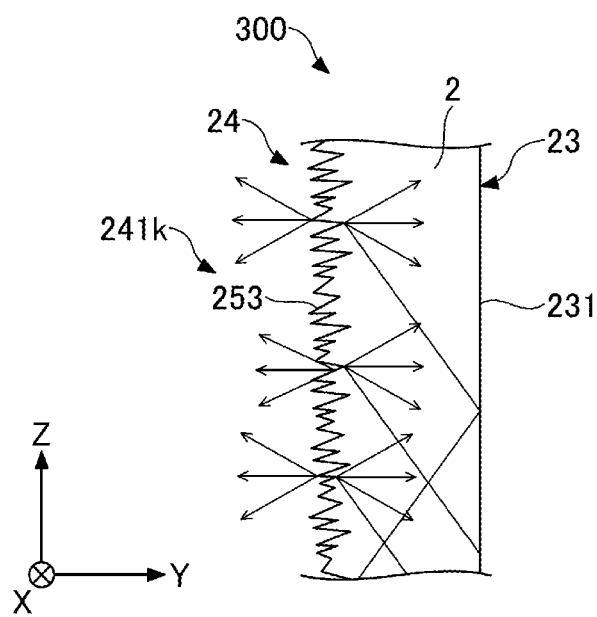
FIG. 9B is a diagram that illustrates a twelfth example structure of the light extracting part.
Figure 10A:
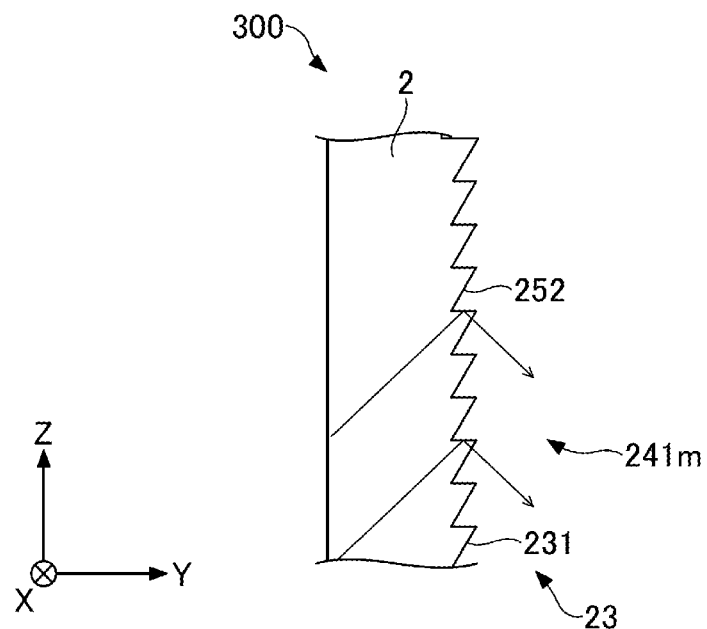
FIG. 10A is a diagram that illustrates a thirteenth example structure of the light extracting part.
Figure 10B:
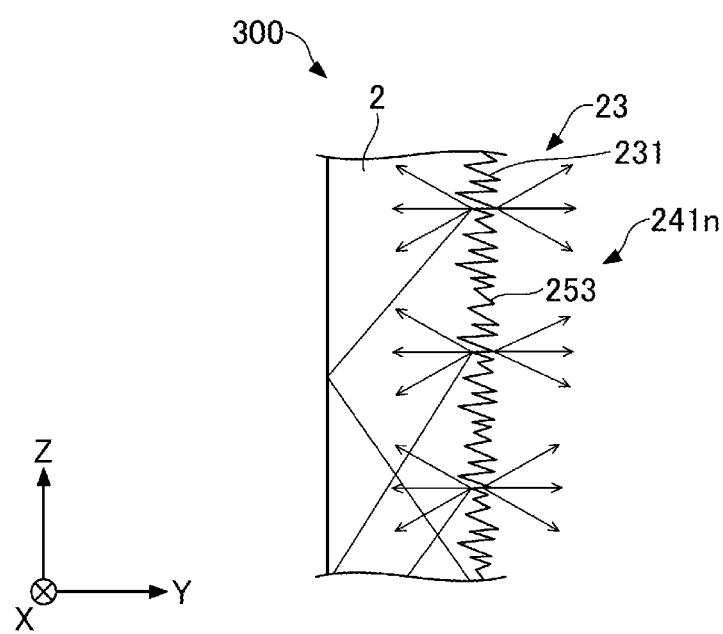
FIG. 10B is a diagram that illustrates a fourteenth example structure of the light extracting part.

Next, the structure of the light extracting part of the light guiding part 300 will be described with reference to FIG. 4A to FIG. 10B. FIG. 4A to FIG. 10B are partially enlarged views that illustrate example detailed structures of the light extracting part. FIG. 4A illustrates a first example, FIG. 4B illustrates a second example, FIG. 5A illustrates a third example, and FIG. 5B illustrates a fourth example. Likewise, FIG. 6A illustrates a fifth example, FIG. 6B illustrates a sixth example, FIG. 7A illustrates a seventh example, FIG. 7B illustrates an eighth example, FIG. 8A illustrates a ninth example, and FIG. 8B illustrates a tenth example. Furthermore, FIG. 9A illustrates an eleventh example, FIG. 9B illustrates a twelfth example, FIG. 10A illustrates a thirteenth example, and FIG. 10B illustrates a fourteenth example.

First, the light extracting part 241 illustrated in FIG. 4A has an optical functional layer 243 including optical cavities 242 inside. The optical functional layer 243 is provided over the second main surface 24. Note that an optical functional layer as used herein means a layer that exhibits optical functions.

The optical functional layer 243 is a thin layer made of resin or the like as a material, and is stacked on the surface of the light guiding panel 2. For example, a layered member including the optical functional layer 243 may be provided on the second main surface 24 by pasting the layered member by an adhesive-free lamination method such as microwave surface treatment, or by gluing the layered member with an adhesive (including a pressure-sensitive adhesive).

Note that layers having other functions such as cover layers may be included before and after the optical functional layer 243 in the direction of stacking.

In order to reduce the refraction and reflection of light at the interface with the light guiding panel 2, the material of the optical functional layer 243 and the material of the adhesive for gluing the optical functional layer 243 to the light guiding panel 2 preferably have refractive indices that are close to that of the light guiding panel 2. For example, the same material as the light guiding panel 2, such as PMMA, can be used.

The optical cavities 242 are examples of voids, the inside of which is filled with air. However, instead of air, the optical cavities 242 may be filled with a material that has a lower refractive index than the optical functional layer. In the optical functional layer 243, a plurality of optical cavities 242 are provided regularly or randomly along the flat surface of the first main surface 23. The size of the optical cavities 242 can be chosen as appropriate within a range the optical cavities 242 that can be provided inside the optical functional layer 243. For the optical functional layer to include optical cavities inside, for example, the optical functional layers disclosed in WO2011/124765, WO2011/127187, WO2019/087118, and WO2019/182091 can be used, but this is by no means a limitation. The entire contents of these literatures are incorporated herein by reference.

The optical functional layer 243 is formed by, for example, sticking together a first film 2431 on which no pattern is formed and a second film 2432 on which desired fine patterns are formed, based on a lamination method, or by gluing together the first film 2431 and the second film 2432 by using an adhesive (including a pressure-sensitive adhesive).

For the formation of fine patterns on the second film 2432, laser patterning, direct laser imaging, laser drilling, masked or maskless laser, or electron beam radiation are used. In addition, it is possible to impart individual characteristics/ features by using printing, inkjet printing, screen printing, and the like, and change the material, the refractive index value, and so forth. Micro/nano-dispensing, dosing, direct "writing," discrete laser sintering, micro-electrical discharge machining (micro-EDM), micro-machining, micro-molding, imprinting, embossing, and the like may be used as well.

The light that is guided inside the light guiding panel 2 passes through or is refracted at the interface between the light guiding panel 2 and the optical functional layer 243, and enters the inside of the optical functional layer 243. Part of the light guided in the optical functional layer 243 is reflected at the interface between the optical functional layer 243 and the optical cavities 242, and directed toward the second light emitting part 231. In this reflected light, the light that enters the first main surface 23 at an angle exceeding the critical angle exits from the inside of the light guiding panel 2 to the outside. The portion in the first main surface 23 where the light exits corresponds to the second light emitting part 231.

Light that is not reflected at the interface between the optical functional layer 243 and the optical cavities 242 is guided in the positive Z-axis direction through repeated total reflections at the interface between the optical functional layer 243 and the outside air. Part of this light is reflected at the interface between the optical cavities 242 and the optical functional layer 243, and exits from the inside of the light guiding panel 2 to the outside. The above reflection occurs in each of a plurality of optical cavities 242 provided in the optical functional layer 243.

In this way, the light extracting part 241 can allow the entire second light emitting part 231, which runs along the flat surface of the first main surface 23, to emit light in the positive Y-axis direction. Note that the angle of the interface between the optical functional layer 243 and the optical cavities 242 is preferably adjusted to an angle suitable for illuminating the negative Z-side of the work desk surface.

Next, the light extracting part 241a illustrated in FIG. 4B has an optical functional layer 245 including light scattering particles 244 inside. The optical functional layer 245 is provided on the second main surface 24. The material and installation method of the optical functional layer 245 are the same as those of the optical functional layer 243 described above.

The light scattering particles 24 are particles that differ from the material of the optical functional layer 245 in the refractive index, and have an average particle size of approximately 0.3 μm to 5 μm. The light scattering particles 244 provide an example of a light scatterer. A plurality of light scattering particles 244 are contained in the material of the optical functional layer 245. For the optical functional layer to include light scattering particles inside, for example, the optical functional layer disclosed in Japanese Patent Application Publication No. 2013-195811 can be used, but this is by no means a limitation. The entire content of this literature is incorporated herein by reference. Here, the average particle size is the volume average particle size, and can be measured, for example, by using an ultracentrifugal automatic particle size distribution analyzer.

The light that is guided inside the light guiding panel 2 passes through or is refracted at the interface between the light guiding panel 2 and the optical functional layer 245 and enters the inside of the optical functional layer 245. Then, part of the light guided inside the optical functional layer 245 is scattered at the interface between the optical functional layer 245 and the light scattering particles 244, and directed toward the second light emitting part 231. In this scattered light, the light that enters the first main surface 23 at an angle not exceeding the critical angle exits from the inside of the light guiding panel 2 to the outside. The portion in the first main surface 23 where the light exits corresponds to the second light emitting part 231.

Light that is not scattered at the interface between the optical functional layer 245 and the light scattering particles 244 is guided in the positive Z-axis direction through repeated total reflections at the interface between the optical functional layer 245 and the outside air. Part of this light is scattered at the interface between the light scattering particles 244 and the optical functional layer 245 and exits the light guiding panel 2 to the outside. The above scattering takes place in each of a plurality of light scattering particles 244 provided in the optical functional layer 245.

In this way, the light extracting part 241*a* can allow the entire second light emitting part 231, which runs along the flat surface of the first main surface 23, to emit light in the positive Y-axis direction.

Next, the light extracting part 241*b* illustrated in FIG. 5A has an optical functional layer 243 including optical cavities 242 inside. The optical functional layer 243 is provided over the first main surface 23. The material and function of the optical functional layer 243 are the same as those of the optical functional layer 243 in the light extracting part 241. The part in the first main surface 23 where the optical functional layer 243 is provided corresponds to the second light emitting part 231.

Also, as illustrated in FIG. 5B, the light extracting part 241*c* has an optical functional layer 245 including light scattering particles 244 inside. The optical functional layer 245 is provided over the first main surface 23. The material and function of the optical functional layer 245 are the same as those of the optical functional layer 245 in the light extracting part 241*a*. The portion in the first main surface 23 where the optical functional layer 245 is provided corresponds to the second light emitting part 231.

Next, the light extracting part 241*d* illustrated in FIG. 6A has optical cavities 246. The optical cavities 246 are placed inside the light guiding panel 2*c*.

Each optical cavity 246 is an example of a void, and its inside is filled with air. However, instead of air, each optical cavity 246 may be filled with a material that has a lower refractive index than the light guiding panel 2*c*. In the light guiding panel 2*c*, a plurality of optical cavities 246 are provided regularly or randomly along the flat surface of the first main surface 23. The size of the optical cavities 246 can be chosen as appropriate within a range the optical cavities 246 can be placed inside the light guiding panel 2.

The light guiding panel 2*c* is formed by, for example, sticking together a first light guiding panel 201 on which no pattern is formed and a second light guiding panel 202 on which desired fine patterns are formed, based on a lamination method such as adhesive-free microwave surface treatment, or by gluing together the first light guiding panel 201 and the second light guiding panel 202 by using an adhesive (including a pressure-sensitive adhesive). In order to reduce the interface reflection, it is preferable to make the refractive indices of the first light guiding panel 201 and the second light guiding panel 202 substantially the same. Also, when gluing together the first light guiding panel 201 and the second light guiding panel 202 by using an adhesive, it is preferable to make the refractive indices of the first light guiding panel 201 and the second light guiding panel 202 substantially the same.

For the formation of fine patterns on the second light guiding panel 202, the same method as for the formation of fine patterns on the second film 2432 described above can be used. Also, the function of the optical cavities 246 is the same as that of the optical cavities 242 described with reference to FIG. 4A and FIG. 5A.

Next, the light extracting part 241*e* illustrated in FIG. 6B has light scattering particles 247. The light scattering particles 247 are provided in the light guiding panel 2*d*. The light scattering particles 247 are particles that differ from the material of the light guiding panel 2*d* in the refractive index, and have an average particle size of about 0.3 μm to 5 μm. The light scattering particles 247 are an example of a light scatterer. The light scattering particles 247 are contained in the material of the light guiding panel 2*d*. The function of the light scattering particles 247 is the same as that of the light scattering particles 244 described earlier with reference to FIG. 4B and FIG. 5B.

Next, the light extracting part 241*f* illustrated in FIG. 7A has an optical functional layer 249 that includes prism parts 248 on its surface. The optical functional layer 249 is provided over the second main surface 24. Each prism part 248 is a portion to include a small slope that can deflect light.

In order to reduce the refraction and reflection of light at the interface between the light guiding panel 2 and the light extraction part 241*f*, it is preferable to form the optical functional layer 249 with a material that has a refractive index close to that of the light guiding panel 2. For example, the optical functional layer 249 may be formed by including PMMA, as in the light guiding panel 2. A plurality of prism parts 248 are formed regularly or randomly on the surface of the optical functional layer 249. The size of the prism parts 248 and the spacing between neighboring prism parts 248 can be chosen as appropriate within a range the prism parts 248 can be formed in the optical functional layer 249.

For the formation of the prism parts 248 in the optical functional layer 249, the same method as for the formation of fine patterns on the second film 2432 described above can be used.

The light guided inside the light guiding panel 2 passes through or is refracted at the interface between the light guiding panel 2 and the optical functional layer 249 and enters the inside of the optical functional layer 243. Then, the light is guided inside the optical functional layer 249, reflected by the prism parts 248, and directed toward the second light emitting part 231. In this reflected light, the light that enters the first main surface 23 at an angle exceeding the critical angle exits from the inside of the light guiding panel 2 to the outside. The portion in the first main surface 23 where the light exits corresponds to the second light emitting part 231. The above scattering takes place in each of a plurality of prism parts 248 provided in the optical functional layer 249.

In this way, the light extracting part 241$f$ can allow the entire second light emitting part 231, which runs along the flat surface of the first main surface 23, to emit light in the positive Y-axis direction. Note that the slope angle of the prism parts 248 is preferably adjusted to an angle suitable for illuminating the negative Z-side of the work desk surface.

Next, the light extracting part 241$g$ illustrated in FIG. 7B has an optical functional layer 251 including a jagged part 250 on its surface. The optical functional layer 251 is provided over the second main surface 24. The material of the optical functional layer 251 is the same as that of the optical functional layer 249 described above. The jagged part 250 is a portion where a plurality of peaks and valleys, approximately 1 μm to 5 μm in width and height, are formed. The jagged part 250 is formed on the surface of the optical functional layer 251 on a random basis, and scatters the light guided in the optical functional layer 251.

For the formation of the jagged part 250 on the optical functional layer 251, the same method as for the formation of fine patterns on the second film 2432 described above can be used. Also, since the jagged part 250 has only to be a random rough surface, blasting or the like can be applied as well.

The light guided inside the light guiding panel 2 passes through or is refracted at the interface between the light guiding panel 2 and the optical functional layer 251, and enters the inside of the optical functional layer 251. Then, part of the light that is guided in the optical functional layer 251 is scattered at the interface between the optical functional layer 251 and the jagged part 250, and directed toward the second light emitting part 231. In this scattered light, the light that enters the first main surface 23 at an angle exceeding the critical angle exits from the inside of the light guiding panel 2 to the outside. The portion in the first main surface 23 where the light exits corresponds to the second light emitting part 231. The above scattering takes place in each of a plurality of jagged parts 250 provided in the optical functional layer 251.

In this way, the light extracting part 241$g$ can allow the entire second light emitting part 231, which runs along the flat surface of the first main surface 23, to emit light in the positive Y-axis direction.

Next, the light extracting part 241$h$ illustrated in FIG. 8A has an optical functional layer 249 that includes prism parts 248 on its surface. The optical functional layer 249 is provided over the first main surface 23. The material and function of the optical functional layer 249 are the same as those of the optical functional layer 249 in the light extracting part 241$f$. In the present case, however, more light is reflected by surfaces other than slopes, such as surfaces 248' in the prism parts 248 that are substantially parallel to the Y-axis. Note that the portion in the first main surface 23 where the optical functional layer 249 is provided corresponds to the second light emitting part 231.

Also, the light extracting part 241$i$ illustrated in FIG. 8B has an optical functional layer 251 including a jagged part 250 on its surface. The optical functional layer 251 is provided over the first main surface 23. The material and function of the optical functional layer 251 are the same as those of the optical functional layer 251 in the light extraction part 241$g$. Note that the portion in the first main surface 23 where the optical functional layer 251 is provided corresponds to the second light emitting part 231.

Next, the light extracting part 241$j$ illustrated in FIG. 9A has prism parts 252. The prism parts 252 are formed over the second main surface 24. Each prism part 252 is a portion to include a small slope that can deflect light. A plurality of prism parts 252 are formed regularly or randomly on the surface of the second main surface 24. The size of the prism parts 252 and the spacing between neighboring prism parts 252 can be chosen as appropriate within a range the prism parts 252 can be formed in the second main surface 24. The light deflected at the prism parts 252 is emitted through the second light emitting part 231.

For the formation of the prism parts 252 in the second main surface 24, the same method as for the formation of the prism parts 248 in the optical functional layer 249 described above can be used. Also, the function of the prism parts 252 is the same as that of the prism parts 248 described in FIG. 7A and FIG. 8A.

Also, the light extracting part 241$k$ illustrated in FIG. 9B has a jagged part 253. The jagged part 253 is formed in the second main surface 24. The jagged part 253 is a portion where a plurality of peaks and valleys, approximately 1 μm to 5 μm in width and height, are formed. The jagged part 253 is formed in the second main surface 24 on a random basis, and scatters the light guided in the optical functional layer 251. The light scattered by the jagged part 253 is emitted through the second light emitting part 231.

For the formation of the jagged part 253 on the second main surface 24, the same method as for the formation of the jagged part 250 in the optical functional layer 251 described above can be used. Also, the function of the jagged part 253 is the same as that of the jagged parts 250 described in FIG. 7B and FIG. 8B.

Next, the light extracting part 241$m$ illustrated in FIG. 10A has prism parts 252. The prism parts 252 are formed in the first main surface 23. The prism parts 252 are the same as the prism parts 252 in the light extracting part 241$j$. In the present case, however, more light is reflected by surfaces other than slopes, such as surfaces 252' in the prism parts 252 that are substantially parallel to the Y-axis. Note that the portion in the first main surface 23 where a plurality of prism parts 252 are provided corresponds to the second light emitting part 231.

Also, the light extracting part 241$n$ illustrated in FIG. 10B has a jagged part 253. The jagged part 253 is formed in the first main surface 23. The jagged part 253 is the same as the jagged part 253 in the light extracting part 241$k$. Note that the portion in the first main surface 23 where a plurality of jagged parts 253 are formed corresponds to the second light emitting part 231.

<Effects of the Desktop Lighting Device 100>

Next, effects of the desktop lighting device 100 will be explained.

Accompanying the work style reforms of recent years, it has become important to secure a workspace where individuals can work comfortably. For lighting devices that illuminate work spaces such as task lights, there is also a strong demand for ones that can ensure better task productivity.

As such a lighting device, for example, a structure is disclosed that includes: a light guiding member with a light-emitting surface that is substantially orthogonal to a light incident end surface facing a light source; and a prism sheet placed on the light emitting surface. Also disclosed is a structure in which light is emitted from the tip and the peripheral surface of a cylindrical light guiding member.

However, a structure in which one light emitting surface emits light through a prism sheet may fail to ensure light illuminance that is sufficient for work. Also, a structure in which the tip and the peripheral surface of a cylindrical light guiding member emit light may be unable to illuminate a predetermined wide range in an overlapping manner with the lights emitted from both parts, and therefore fail to ensure sufficient task productivity.

The desktop lighting device 100 according to this embodiment has a light source and a light guiding panel for guiding the light emitted from the light source, and allows the light emitted from the light source to enter the inside of the light guiding panel through a light incident end surface that is situated facing the light source. Also, the desktop lighting device 100 according to this embodiment allows the light guided inside the light guiding panel to be emitted from both a first light emitting part, which is included in the opposite end from the light incident end surface, and a second light emitting part, which is included in the main surface of the light guiding panel that intersects with the light incident end surface.

By this means, for example, the light that is emitted from the first light emitting part can illuminate the hand of the worker and ensure sufficient illuminance that is suitable for work, and the light emitted from the second light emitting part can illuminate the work desk over a wide range. Also, since light is emitted from a wide area in each of the first light emitting part and the second light emitting part, the directivity of light is alleviated, and it becomes possible to reduce the specularly reflected light from the illuminated work desk surface, from the surface of paper placed on the work desk, and so forth, and reduce the glare. By this means, it is possible to ensure task productivity with sufficient light illuminance while reducing the glare. The desktop lighting device 100 according to this embodiment can utilize both the light that is emitted from the first light emitting part and the light emitted from the second light emitting part. The ratio of the amount of light from the second light emitting part to the total amount of light from the first light emitting part and the second light emitting part is not particularly limited, but is preferably at least 1% or more. The amount of light can be measured by using, for example, a total luminous flux measurement system (manufactured by Otsuka Electronics Co., Ltd.). The amount of light emitted from the second light emitting part can be adjusted, for example, by adjusting the area of the second light emitting part.

Note that the structure to illuminate the hand of the worker with the light that is emitted from the first light emitting part and to illuminate the work desk over a wide range with the light emitted from the second light emitting part, shown with the present embodiment, is only an example. That is, the function of the light that is emitted from the first light emitting part and the function of the light emitted from the second light emitting part are by no means limited to these. With the present embodiment, for example, the light that is emitted from the first light emitting part and the light emitted from the second light emitting part can be combined and illuminate the work desk surface.

Also, a desktop lighting device to use an LED as a light source might see multi-shadow phenomenon, in which, due to the high directivity of the light emitted from the LED, the worker's hand, pen, and so forth in the illuminated range have multiple shadows, and which may therefore distract the worker's concentration. With the present embodiment, however, light is emitted from a wide area of each of the first light emitting part and the second light emitting part to alleviate the directivity of light, thereby eliminating such multi-shadow phenomenon and illuminating the worker's hand with natural light and shadow. By this means, it is possible to reduce the decrease in the worker's concentration.

Also, according to this embodiment, since a light guiding part that is transparent to visible light is used, the worker can see through the light guiding part. By this means, a comfortable working space can be provided without detracting from the sense of open space.

Here, the visible light transmittance of the light guiding part including the light guiding panel and the light extracting part is preferably 60% or more, 65% or more, 70% or more, 75% or more, 80% or more, 85% or more, or 90% or more. The transmittance of visible light is specified as the average value of transmittance at each wavelength, measured by using a spectrophotometer at a measurement wavelength of 380 nm or more and 780 nm or less.

Also, according to the present embodiment, the light guiding panel has a bent part, so that, by making the direction of emission between the light that is emitted from the first light emitting part and the light emitted from the second light emitting part different, it is possible to allow the illumination from the first light emitting part and the illumination from the second light emitting part to overlap each other on the work desk surface with ease.

Note that, although example structures have been illustrated above with the present embodiment in which the second light emitting part is provided on the first main surface 23, this is by no means limiting, and the second light emitting part can be provided on the third main surface 25 or the like (see FIG. 1A and FIG. 1B). Also, although the light guiding panel, the first light emitting part, and the light extracting part have been described in a variety of structures with the present embodiment, it is also possible to combine these and make a lighting device.

Also, the spread angle of light emitted from the second light emitting part can be made anisotropic. For example, it is possible to emit the light illustrated in FIG. 1A and FIG. 1B with a large spread angle in the X-axis direction and a small spread angle in the Z-axis direction from the second light emitting part.

Second Embodiment

Next, the desktop lighting device 100a according to the second embodiment will be described. Note that the description of parts that overlap with the first embodiment will be omitted as appropriate. This point also applies to the description of the following embodiments.

In the present embodiment, an emitting light deflection part that deflects the light that is emitted from the first light emitting part is further provided, so that the light that is emitted from the first light emitting part can efficiently illuminate a predetermined area. Here, the emitting light deflection part is a component that includes one or more optical elements and deflects the light that is emitted from the first light emitting part.

<Example Structures of the Desktop Lighting Device 100a>

Figure 11A:
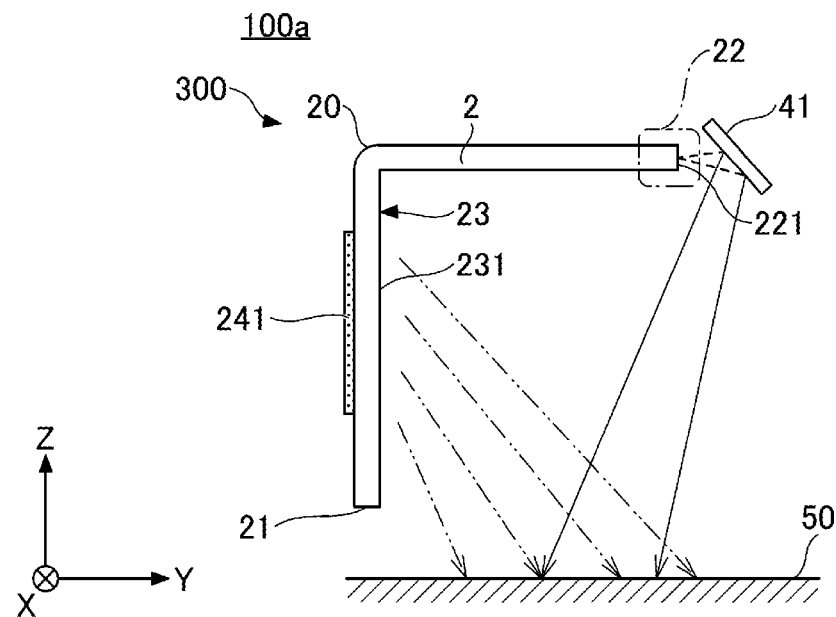
FIG. 11A is a diagram that illustrates a first example structure of a desktop lighting device according to a second embodiment.
Figure 11B:
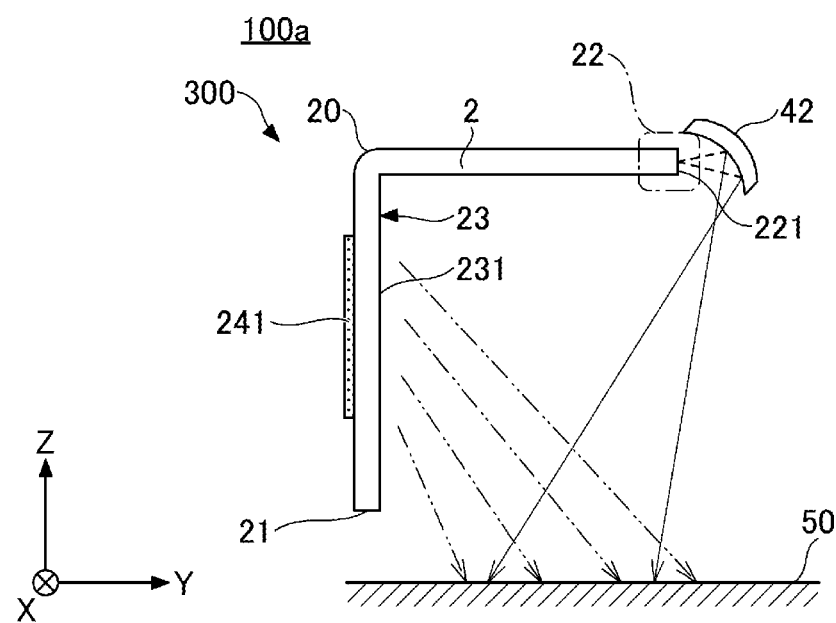
FIG. 11B is a diagram that illustrates a second example structure of the desktop lighting device according to the second embodiment.
Figure 11C:
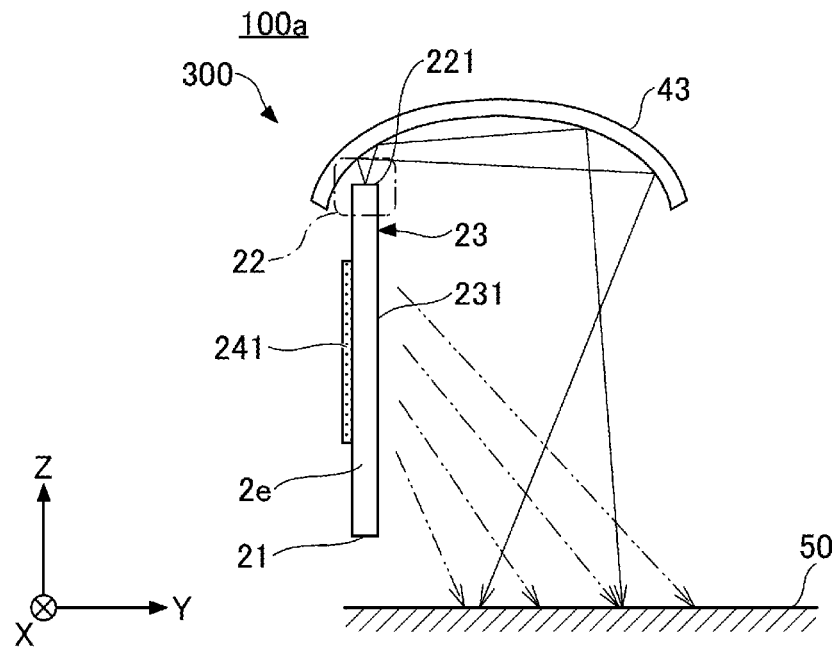
FIG. 11C is a diagram that illustrates a third example structure of the desktop lighting device according to the second embodiment.
Figure 11D:
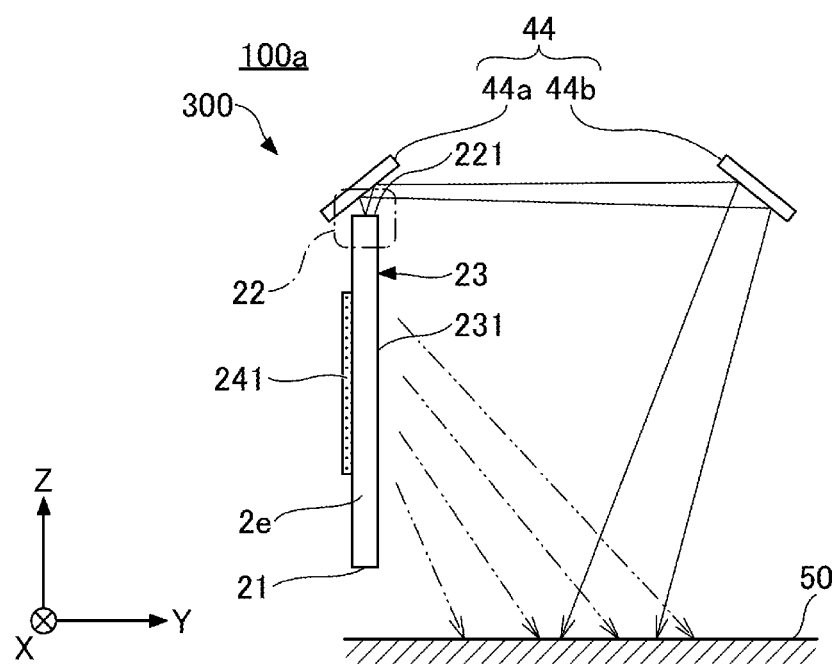
FIG. 11D is a diagram that illustrates a fourth example structure of the desktop lighting device according to the second embodiment.

FIG. 11A to FIG. 11D are diagrams that explain example structures of a desktop lighting device 100a according to this embodiment, where FIG. 11A illustrates a first example, FIG. 11B illustrates a second example, FIG. 11C illustrates a third example, and FIG. 11D illustrates a fourth example. FIG. 11A to FIG. 11D are side views of the desktop lighting device 100a, in which, among the components of the desktop lighting device 100a, only the light guiding panel and the emitting light deflection part are illustrated.

The desktop lighting device 100a illustrated in FIG. 11A has a flat mirror 41. The flat mirror 41 is an example of an emitting light deflection part that has a flat reflecting surface and deflects the light that is emitted from the first light emitting part 221. The flat mirror 41 is supported by a support so as to be rotatable about the X-axis.

The flat mirror 41 deflects the light that is emitted from the first light emitting part 221, which is included in the opposite end 22 of the light incident end surface 21 in the light guiding panel 2, and illuminates the work desk surface 50. By rotating the flat mirror 41 about the X axis, it is possible to change the position on the work desk surface 50 that is illuminated with the light. The light emitted from the second light emitting part 231 and the light that is emitted from the first light emitting part 221 overlap and illuminate the work desk surface 50. Note that the size of the flat mirror 41 can be chosen as appropriate.

Next, the desktop lighting device 100a illustrated in FIG. 11B has a concave mirror 42 as an example of the emitting light deflection part. The concave mirror 42 is an example of an emitting light deflection part that has a concave reflecting surface having a curvature only in a direction orthogonal to the X axis and deflects the light that is emitted from the first light emitting part 221. The concave mirror 42 is supported by a support so as to be rotatable about the X axis.

Although the function of the concave mirror 42 is the same as that of the flat mirror 41, by having a concave reflecting surface, the concave mirror 42 is able to broaden or narrow the spread angle of light emitted from the first light emitting part 221 with respect to the direction orthogonal to the X-axis. Note that the curvature and size of the concave mirror 42 can be chosen as appropriate.

Next, the desktop lighting device 100a illustrated in FIG. 11C has a light guiding panel 2e and a large-diameter concave mirror 43 as an example of the emitting light deflection part.

The light guiding panel 2e is formed with a flat member, guides the light incident from the light incident end surface 21 in the positive Z-axis direction, and emits the light through the first light emitting part 221 in the positive Z-axis direction.

The large-diameter concave mirror 43 is an example of an emitting light deflection part that has a concave reflecting surface having a curvature only in a direction that intersects with the X axis and deflects the light that is emitted from the first light emitting part 221. The large-diameter concave mirror 43 is supported by a support so as to be rotatable about the X-axis.

The large-diameter concave mirror 43 deflects the light that is emitted from the first light emitting part 221 in the positive Y-direction and then in the negative Z direction, so as to illuminate the work desk surface 50. By rotating the large-diameter concave mirror 43 about the X axis, it is possible to change the position on the work desk surface 50 that is illuminated with the light. Note that the curvature and size of the large-diameter concave mirror 43 can be chosen as appropriate.

Next, the desktop lighting device 100a illustrated in FIG. 11D has a flat mirror set 44 as an example of the emitting light deflection part. The flat mirror set 44 includes flat mirrors 44a and 44b with flat reflecting surfaces, and provides an example of a deflecting light emitting part that deflects the light that is emitted from the first light emitting part 221. At least one of the flat mirrors 44a and 44b is supported by a support so as to be rotatable about the X axis.

The flat mirror 44a deflects the light that is emitted from the first light emitting part 221 in the positive Y direction, and the flat mirror 44b furthermore deflects the light deflected by the flat mirror 44a in the negative Z direction, thus illuminating the work desk surface 50. The flat mirror set 44 can change the position on the work desk surface 50 that is illuminated with the light, by rotating at least one of the flat mirrors 44a and 44b about the X axis. Note that the size of the flat mirrors 44a and 44b can be chosen as appropriate.

<Effects of the Desktop Lighting Device 100a>

The light that is emitted from the first light emitting part of the light guiding panel may be emitted in an unspecified direction or spread out, and therefore the light may not be emitted on the work desk surface efficiently.

In this embodiment, the direction and/or the spread angle of the light that is emitted from the first light emitting part is deflected by the emitting deflection light part in a desired direction and/or at a desired spread angle, so that it is possible to determine the direction and/or the spread angle of the light that is emitted from the first light emitting part, and to illuminate a predetermined area efficiently with the light that is emitted from the first light emitting part.

Note that the effects other than the above are the same as those described in the first embodiment.

Third Embodiment

Next, a desktop lighting device 100b according to a third embodiment will be described.

This embodiment provides a low refractive index layer, which has a lower refractive index than the light guiding panel, in at least part of at least one of the first main surface and the second main surface of the light guiding panel, so that it is possible to prevent loss of light guided inside the light guiding panel due to scratches, stains, fingerprints, and so on, and thus improve the efficiency of use of light. Note that the low refractive index layer may be formed and provided in at least part of at least one of the first main surface and the second main surface, or may be joined together with the light guiding panel by using an adhesive (including a pressure sensitive adhesive).

Figure 12A:
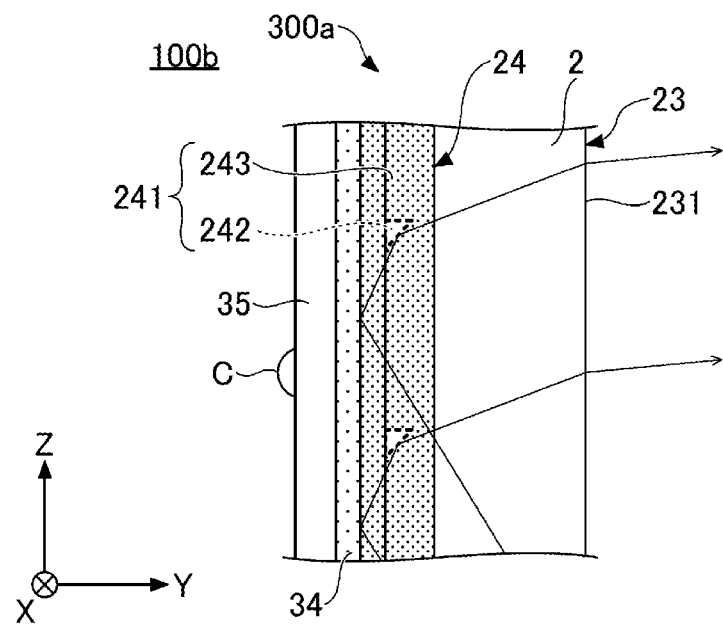
FIG. 12A is a diagram that illustrates the vicinity of a surface of a light guiding panel according to a third embodiment.
Figure 12B:
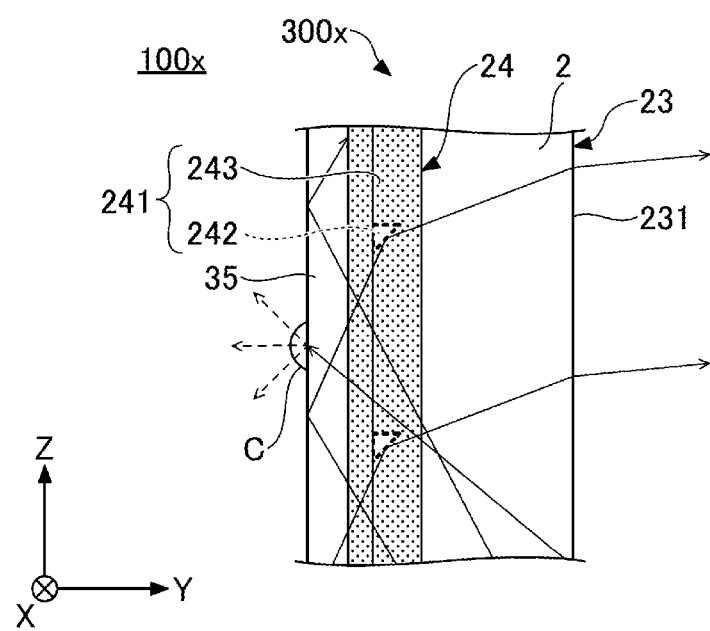
FIG. 12B is a diagram that illustrates the vicinity of a surface of a light guiding panel according to a comparative example.

FIG. 12A and FIG. 12B are diagrams that illustrate example functions of the low refractive index layer 34 in the desktop lighting device 100b. FIG. 12A is a diagram that illustrates the vicinity of a surface of a light guiding panel according to the present embodiment, and FIG. 12B is a diagram that illustrates the vicinity of a surface of a light guiding panel according to a comparative example.

As illustrated in FIG. 12A, the desktop lighting device 100b has a light guiding part 300a. In the light guiding part 300a, an optical functional layer 243, a low refractive index layer 34, and a cover layer 35 are stacked in this order on the surface of the light guiding panel 2. Note that layers with other functions may be included between the surface of the light guiding panel 2 and the low refractive index layer 34.

Also, the visible light transmittance of the light guiding part 300a including the light guiding panel 2, the optical functional layer 243, the low refractive index layer 34, and the cover layer 35 is preferably 60% or more, 65% or more, 70% or more, 75% or more, 80% or more, 85% or more, or 90% or more. The transmittance of visible light is specified as the average value of transmittance at each wavelength, measured by using a spectrophotometer at a measurement wavelength of 380 nm or more and 780 nm or less.

The low refractive index layer 34 is a layer having a lower refractive index than the refractive index of the light guiding panel 2. When the light guiding panel 2 mainly includes PMMA, the refractive index $n_1$ of the light guiding panel 2 is approximately 1.49. By comparison with this, the refractive index $n_2$ of the low refractive index layer 34 is preferably 1.30 or less, and more preferably 1.20 or less. For the low refractive index layer, for example, the low refractive index layer with voids disclosed in WO2019/146628 can be used, but this is by no means a limitation. The entire content of this literature is incorporated herein by reference.

When light is guided inside the light guiding panel 2, the light satisfies the condition of total reflection if the angle of incidence to the low refractive index layer 34 is larger than the critical angle (when incident at a shallow angle), and the light is totally reflected at the interface between the light guiding panel 2 and the low refractive index layer 34. Here, the critical angle θc is represented by the following formula:

$$\theta c = \theta i = \arcsin(n_2/n_1)$$

Note that θi is the angle of incidence (the angle with respect to the normal).

The cover layer 35 is for protecting the light guiding panel 2, and preferably has high transparency to visible light. The cover layer 35 may be made of glass, plastic, or the like, and provide an effect of absorbing ultraviolet radiation. From the perspective of providing a protective layer, the higher the strength, the better, but a thin and flexible layer may be used as well.

Here, in the desktop lighting device 100X according to a comparative example, illustrated in FIG. 12B, the optical functional layer 243 and the cover layer 35 are stacked in this order on the surface of the light guiding panel 2 included in the light guiding part 300X, and no low refractive index layer is provided. In this case, if foreign matter C such as scratches, dirt, fingerprints, sweat, or dust is stuck to the surface of the cover layer 35, then, of the light guided inside the light guiding panel 2, the light directed toward the cover layer 35 may be scattered by the foreign matter C and leak from the light guiding panel 2 to the outside, resulting in light loss.

As illustrated in FIG. 12A, by providing the low refractive index layer 34 between the cover layer 35 and the light guiding panel 2, the light guided inside the light guiding panel 2 can be prevented from hitting the foreign matter C.

In this way, according to the present embodiment, a low refractive index layer with a lower refractive index than the light guiding panel is provided in at least part of the main surface included in the light guiding panel, so that it is possible to prevent the light guided in the light guiding panel from getting lost due to scratches, stains, fingerprints, and so forth, and to improve the efficiency of use of light.

The above effect can be obtained by providing a low refractive index layer in at least part of at least one of the first main surface and the second main surface of the light guiding panel 2. The above effect can also be obtained by providing a low refractive index layer in an area in at least one of the first main surface and the second main surface where the optical functional layer is not provided. Furthermore, although example structures have been illustrated with FIG. 12A and FIG. 12B in which a low refractive index layer is provided on an optical functional layer including optical cavities, it is also possible to provide the low refractive index layer on an optical functional layer including light scattering particles.

Fourth Embodiment

Next, a desktop lighting device 100c according to a fourth embodiment will be described.

In this embodiment, an optical element that diverges or converges light is further provided between the light source and the light incident end surface, and this optical element is provided so as to be movable in a direction that intersects with the light incident end surface. By moving the optical element, it is possible, for example, to switch between a state in which virtually no light is emitted from the second light emitting part and a state in which light is emitted from the second light emitting part.

Figure 13A:
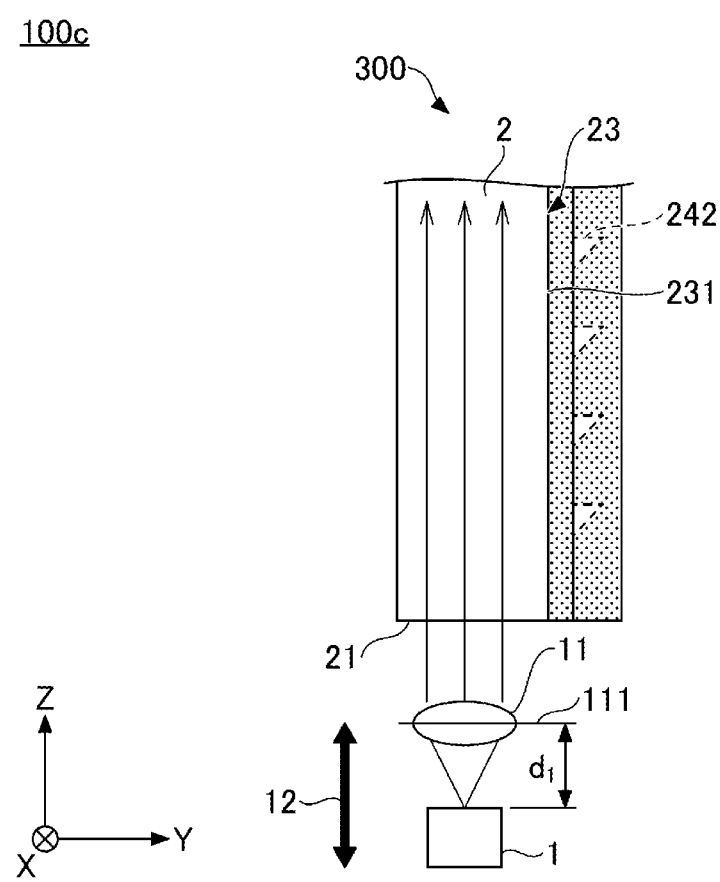
FIG. 13A is a diagram that illustrates a state in which virtually no light is emitted from a second light emitting part in a desktop lighting device according to a fourth embodiment.
Figure 13B:
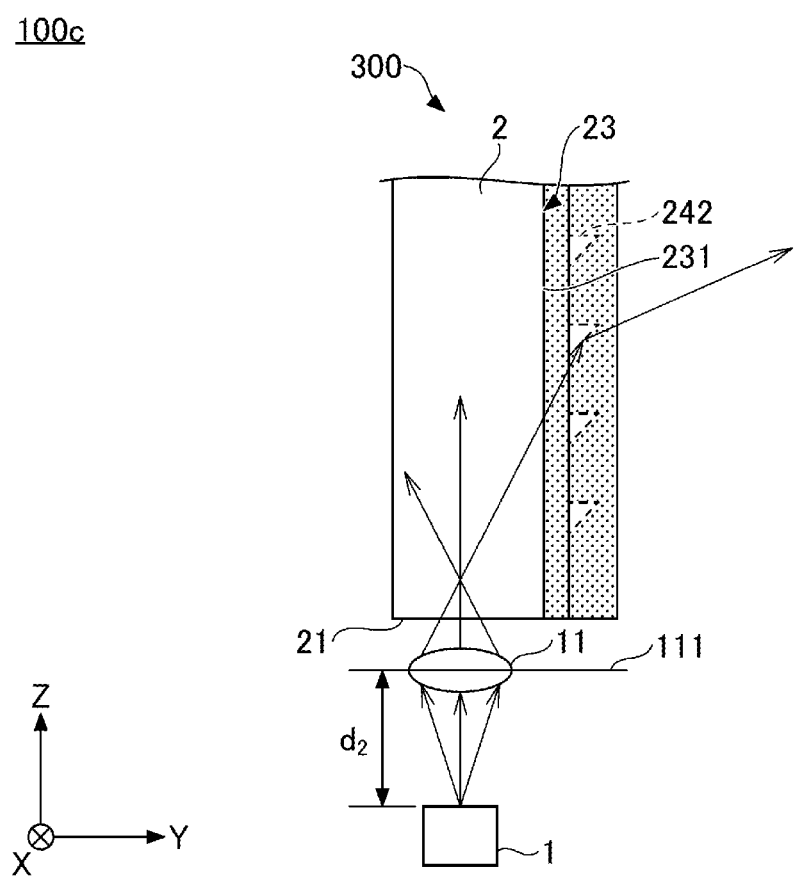
FIG. 13B is a diagram that illustrates a state in which light is emitted from the second light emitting part in the desktop lighting device according to the fourth embodiment.

FIG. 13A and FIG. 13B are diagrams that explain example structures of the desktop lighting device 100c, where FIG. 13A illustrates a state in which virtually no light is emitted from the second light emitting part, and FIG. 13B illustrates a state in which light is emitted from the second light emitting part. Note that FIG. 13A and FIG. 13B show enlarged views of the vicinity of the light incident end surface 21 on the light guiding panel 2.

As illustrated in FIG. 13A and FIG. 13B, the desktop lighting device 100c has a lens 11 between the light source 1 and the light incident end surface 21. The lens 11 is held by a holding part and provided together with the holding part so as to be movable in a direction that intersects with the light incident end surface 21. In the examples of FIG. 13A and FIG. 13B, the direction that intersects with the light incident end surface 21 corresponds to the Z-axis direction. Note that the lens's diameter, focal distance, and so forth can be chosen as appropriate.

The lens 11 is an example of an optical element that diverges, converges, or collimates light rays. Either a refractive lens or a diffraction lens can be used as the lens 11. When light rays emitted from the light source 1 are transmitted through the lens 11, the angle of divergence or convergence changes, and, subsequently, the light rays enter the inside of the light guiding panel 2 through the light incident end surface 21. The lens 11 can move in the direction of the arrow 12 in the Z-axis direction. By allowing the lens 11 to move, the angle of divergence or convergence of light rays after transmitting through the lens 11 can be changed, or the light rays can be made substantially parallel. For example, by making the light rays having been transmitted through the lens 11 substantially parallel, it is possible to provide a state in which virtually no light is emitted from the second light emitting part 231. Here, the state in which virtually no light is emitted from the second light emitting part 231 means, for example, a state in which light is not emitted from the second light emitting part 231 and in which light is emitted only from the first light emitting part 221 (see FIG. 1A and FIG. 1B). Alternatively, the above state may refer to a state in which the amount of light emitted from the second light emitting part 231 is substantially small (for example, less than 1%) compared to the amount of light emitted from the first light emitting part 221 (see FIG. 1A and FIG. 1B).

In FIG. 13A, the distance $d_1$ from a main flat surface 111 of the lens 11 to the light source 1, nearly matches the focal distance of the lens 11. As a result of this, the light rays having been transmitted through the lens 11 are made substantially parallel, so that the light rays that enter the inside of the light guiding panel 2 travel straight through the light guiding panel 2 and do not hit the optical cavities 242. As a result of this, the optical cavities 242 do not reflect light, and virtually no light is emitted from the second light emitting part 231.

On the other hand, in FIG. 13B, the lens 11 moves in the positive Z-axis direction from the state of FIG. 13A, the distance $d_2$ from the main flat surface 111 of the lens 11 to the light source 1 is longer than the focal distance of the lens 11. As a result of this, the light rays that have been transmitted through the lens 11 become a bundled light, and the light that enters the light guiding panel 2 is guided inside the light guiding panel 2 through repeated total reflections. The light hitting the optical cavities 242 through repeated total reflections is reflected by the optical cavities 242 and emitted from the second light emitting part 231. Furthermore, the light guided inside the light guiding panel 2 and reaching the first light emitting part 221 is emitted from the first light emitting part 221. That is, light is emitted from both the first light emitting part 221 and the second light emitting part 231.

By allowing the lens 11 to move in this manner, it is possible to switch between a state in which virtually no light is emitted from the second light emitting part and a state in which light is emitted from the second light emitting part. Note that, by allowing the lens 11 to move in a direction that intersects with the light incident end surface, the direction of light emitted from the second light emitting part 231 changes. Consequently, it is also possible to adjust the position and range on the work desk surface to illuminate with the light emitted from the second light emitting part 231. Furthermore, the distance from the main flat surface 111 of the lens 11 to the light source 1 can be made shorter than the focal distance of the lens 11, so that divergent light can enter the inside of the light guiding panel 2.

Fifth Embodiment

Next, a desktop lighting device 100d according to a fifth embodiment will be described.

Figure 14A:
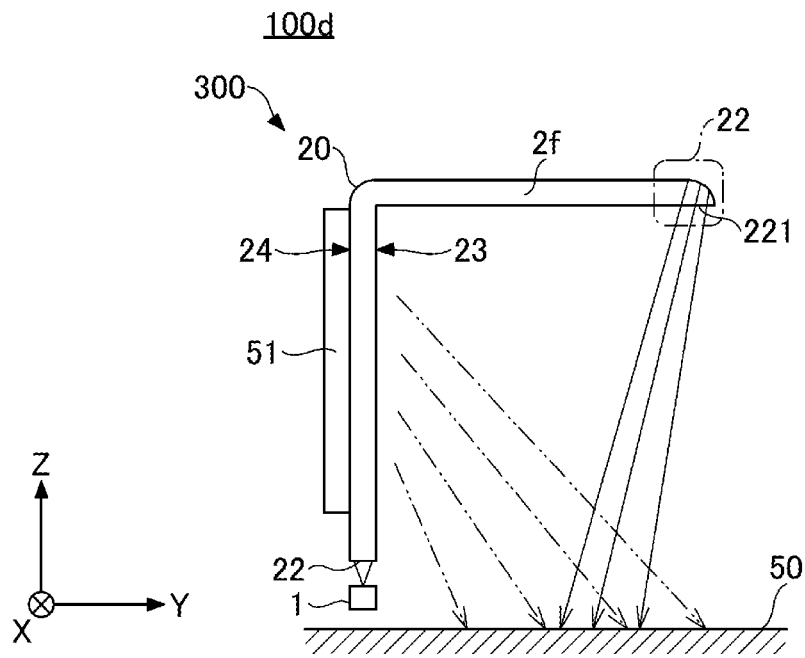
FIG. 14A is a diagram that illustrates a first example structure of a desktop lighting device according to a fifth embodiment.
Figure 14B:
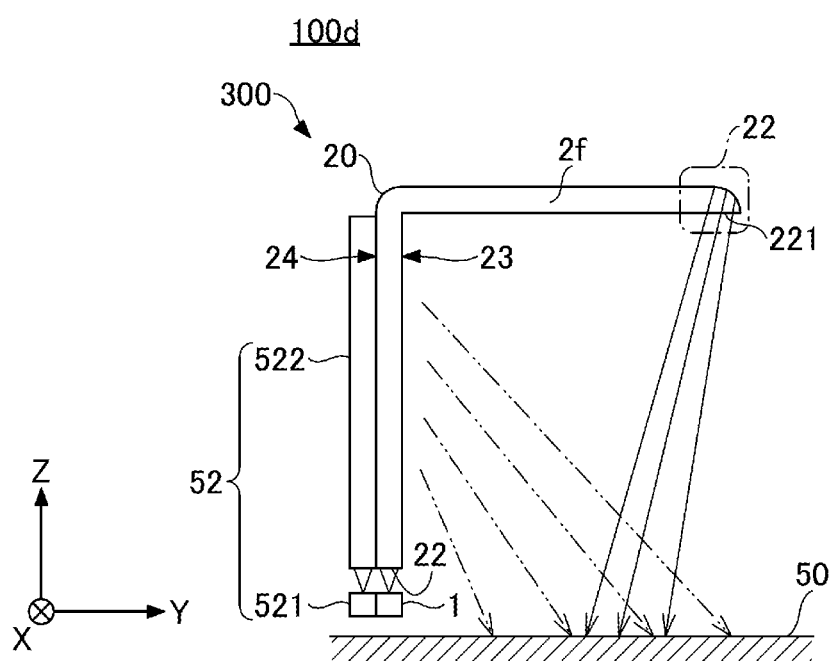
FIG. 14B is a diagram that illustrates a second example structure of the desktop lighting device according to the fifth embodiment.
Figure 14C:
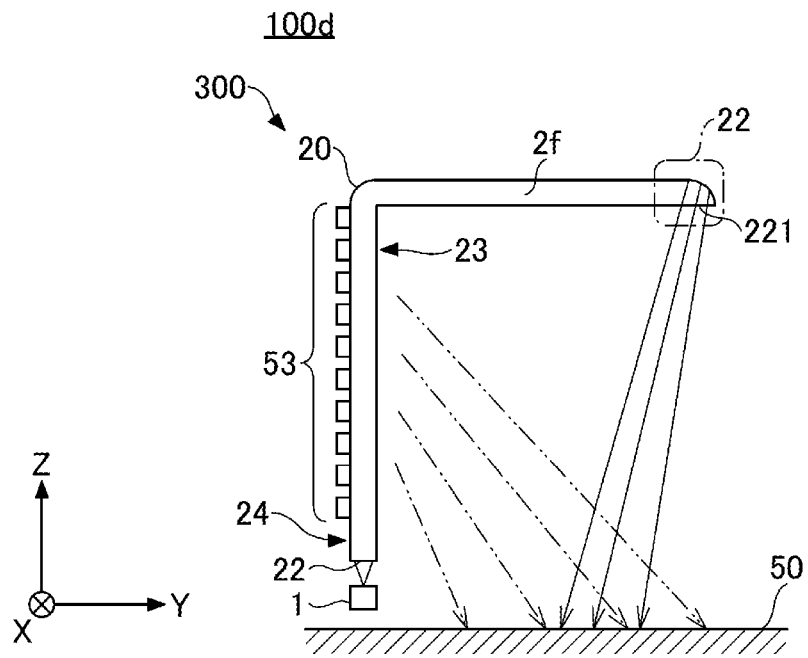
FIG. 14C is a diagram that illustrates a third example structure of the desktop lighting device according to the fifth embodiment.

FIG. 14A to FIG. 14C are diagrams that illustrate example structures of the desktop lighting device 100d according to the present embodiment. FIG. 14A illustrates a first example, FIG. 14B illustrates a second example, and FIG. 14C illustrates a third example. FIG. 14A, FIG. 14B, and FIG. 14C are all side views of the desktop lighting device 100d.

The desktop lighting device 100d illustrated in FIG. 14A has a light guiding panel 2f and an organic EL (Electro-Luminescent) light emitting body 51.

The light guiding panel 2f included in the light guiding part 300 differs from the light guiding panel 2 of the above-described desktop lighting device 100 (see FIG. 1A and FIG. 1B) in that it does not have the second light emitting part 231 or the light extracting part 241, but the other components are the same as the light guiding panel 2. Note that the first light emitting part 221 in the light guiding panel 2 corresponds to an example of a light emitting part.

The organic EL light emitting body 51 is an example of a surface light emitting body that emits light from its surface in a direction that intersects with the first main surface 23 of the light guiding panel 2, which intersects with the light incident end surface 21. The organic EL light emitting body 51 constitutes a light-emitting diode in which the light-emitting layer is made of an organic compound. The organic EL light emitting body 51 emits light from its surface based on organic EL phenomenon, in which excitons generated by recombination of electrons and holes injected into an organic compound emit light. The organic EL light emitting body 51 emits light from its surface, toward the first main surface 23, in a direction that intersects with the first main surface 23. The position and size of the organic EL light emitting body 51 are not particularly limited. For example, the organic EL light emitting body 51 may be approximately the same size as the first main surface 23 of the light guiding panel 2f, as illustrated in FIG. 14A. The organic EL light emitting body 51 preferably emits light from its surface, toward the first main surface 23, at such an angle that the light that is transmitted through the first main surface 23 and the second main surface 24 of the light guiding panel 2f illuminates the work desk surface 50.

The work desk surface 50 is illuminated by the light that is emitted from the first light emitting part 221 of the light guiding panel 2f and the light that is emitted from the surface of the organic EL light emitting body 51 and transmitted through the first main surface 23 and the second main surface 24.

Note that the organic EL light emitting body 51 may also be an inorganic EL light emitting body that is capable of surface light emission.

Next, the desktop lighting device 100d illustrated in FIG. 14B has a light guiding panel 2f and a light emitting/guiding body 52.

The light emitting/guiding body 52 has a light source 521 and a light guiding panel 522. For the light source 521, the same light source as the light source 1 in the above-described desktop lighting device 100 can be used. The light guiding panel 522 differs from the light guiding panel 2 in the above-described desktop lighting device 100 in that it does not have the bent part 20 or the first light emitting part 221, but the other components are the same as the light guiding panel 2. However, it is preferable to shade the positive Z end surface of the light guiding panel 522 such that the light emitted from the light source 521 and guided inside the light guiding panel 522 is not emitted from the positive Z end surface of the light guiding panel 522.

The light emitting/guiding body 52 is an example of a surface light emitting body that emits light from its surface in a direction that intersects with the first main surface 23 of the light guiding panel 2, which intersects with the light incident end surface 21. The light emitting/guiding body 52 emits light from its surface, toward the first main surface 23, in a direction that intersects with the first main surface 23. The position and size of the light emitting/guiding body 52 are not particularly limited. For example, the light emitting/guiding body 52 may be approximately the same size as the first main surface 23 of the light guiding panel 2f, as illustrated in FIG. 14B. The light emitting/guiding body 52 preferably emits light from its surface toward the first main surface 23 at such an angle that the light that is transmitted through the first main surface 23 and the second main surface 24 of the light guiding panel 2f illuminates the work desk surface 50.

The work desk surface 50 is illuminated by the light that is emitted from the first light emitting part 221 of the light guiding panel 2f and the light that is emitted from the surface of the light emitting/guiding body 52 and transmitted through the first main surface 23 and the second main surface 24.

The desktop lighting device 100d illustrated in FIG. 14C has a light guiding panel 2f and a micro LED array light emitting body 53.

In the micro LED array light emitting body 53, the pixels are formed with LEDs that emit lights of respective colors, namely R (red), G (green), and B (blue), and the LEDs forming each pixel are arranged in a two-dimensional array. This is an example of a surface light emitting body that emits light from its surface by causing the LEDs of the pixels to emit light.

The micro LED array light emitting body 53 is an example of a surface light emitting body that emits light from its surface in a direction that intersects with the first main surface of the light guiding panel 2, which intersects with the light incident end surface 21. The micro LED array light emitting body 53 emits light from its surface toward the first main surface 23, in a direction that intersects with the first main surface 23. The position and size of the micro LED array light emitting body 53 are not particularly limited. For example, the micro LED array light emitting body 53 may be approximately the same size as the first main surface 23 of the light guiding panel 2f, as illustrated in FIG. 14C. The micro LED array light emitting body 53 preferably emits light from its surface toward the first main surface 23 at such an angle that the light that is transmitted through the first main surface 23 and the second main surface 24 of the light guiding panel 2f illuminates the work desk surface 50.

The work desk surface 50 is illuminated by the light that is emitted from the first light emitting part 221 of the light guiding panel 2f and the light that is emitted from the surface of the micro LED array light emitting body 53 and transmitted through the first main surface 23 and the second main surface 24.

Note that the micro LED array light emitting body 53 may be a mini LED array light emitting body that is capable of surface light emission.

Figure 15A:
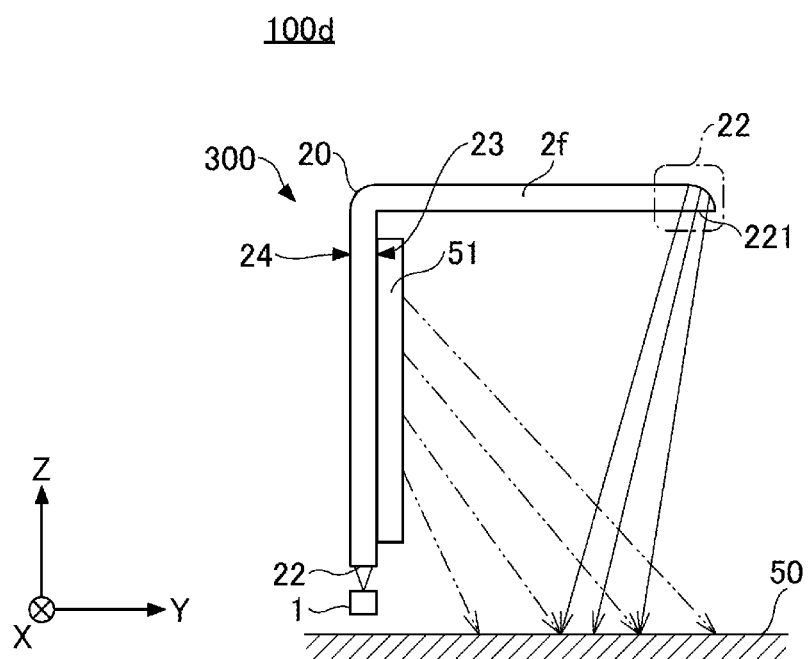
FIG. 15A is a diagram that illustrates a fourth example structure of the desktop lighting device according to the fifth embodiment.
Figure 15B:
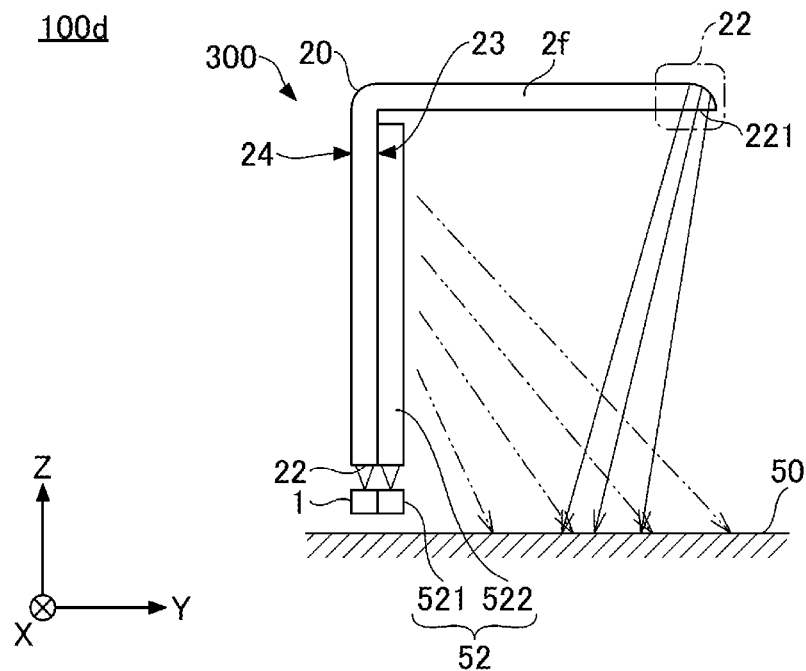
FIG. 15B is a diagram that illustrates a fifth example structure of the desktop lighting device according to the fifth embodiment.
Figure 15C:
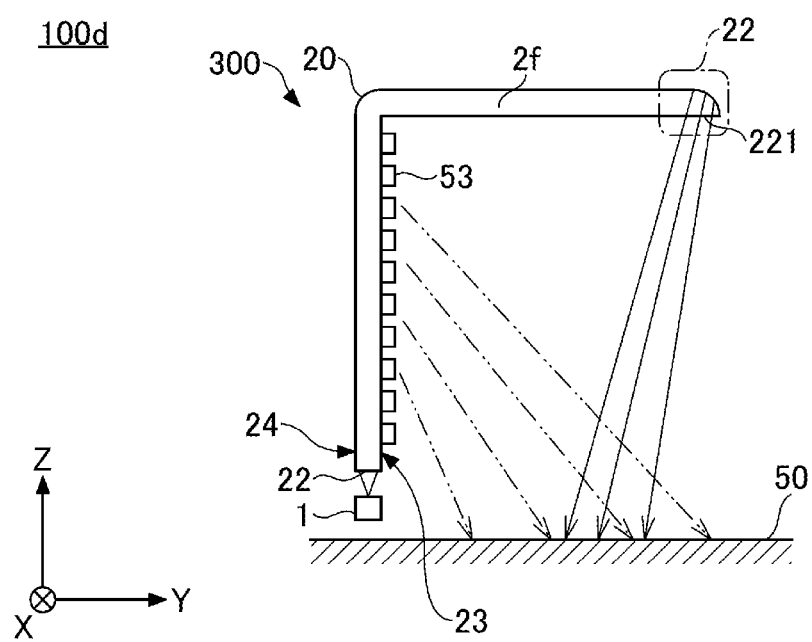
FIG. 15C is a diagram that illustrates a sixth example structure of the desktop lighting device according to the fifth embodiment.

Furthermore, although an example structure has been illustrated above with the present embodiment in which a surface light emitting body is placed opposite the second main surface 24 and emits light from its surface toward the first main surface 23, this is by no means a limitation. It is equally possible to employ a structure in which the surface light emitting body is placed opposite the first main surface 23 and emits light from its surface in a direction that intersects with the first main surface 23, toward the work desk surface 50. FIG. 15A to FIG. 15C are diagrams for explaining such structures of the desktop lighting device 100d, where FIG. 15A is a diagram that illustrates a fourth example, FIG. 15B is a diagram that illustrates a fifth example, and FIG. 15C is a diagram that illustrates a sixth example. Similar to FIG. 14A and FIG. 14B, FIG. 15A to FIG. 15C are all side views of the desktop lighting device 100d.

In FIG. 15A, the organic EL light emitting body 51 is placed opposite the first main surface 23. In FIG. 15B, the light emitting/guiding body 52 is placed opposite the first main surface 23. In FIG. 15C, the micro LED array light emitting body 53 is placed opposite the first main surface 23.

The organic EL light emitting body 51, the light emitting/guiding body 52, and the micro LED array light emitting body 53 emit light from their surfaces, toward the work desk surface 50, in directions that intersect with the first main surface 23. Each lighting angle is preferably adjusted so as to illuminate the work desk surface 50 suitably. The rest is the same as those that have been described earlier with reference to FIG. 14A and FIG. 14B, and so redundant description will be omitted here.

As described above, in the present embodiment, the light that is emitted from the first light emitting part of the light guiding panel and the light that is emitted from the surface of a surface light emitting body and transmitted through the first main surface and the second main surface of the light guiding panel illuminate the work desk surface. By this means, the same effect as that of the above-described desktop lighting device 100 can be achieved.

Sixth Embodiment

Next, a lighting device 100e according to a sixth embodiment will be described. The lighting device 100e is a device that is installed on a sidewall inside a building to illuminate the sidewall surface and the floor surface.

Figure 16:
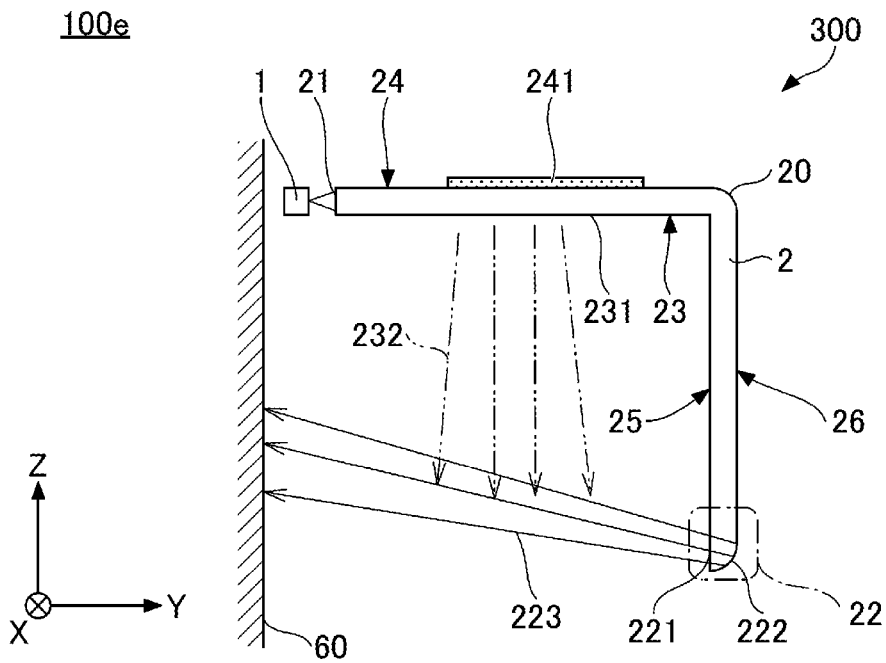
FIG. 16 is a side view that illustrates an example overall structure of a lighting device according to a sixth embodiment.

FIG. 16 is a side view that explains an example overall structure of the lighting device 100e. As illustrated in FIG. 16, the lighting device 100e has the same components as those of the desktop lighting device 100 illustrated in the first embodiment. In the lighting device 100e, each component included in the desktop lighting device 100 is rotated clockwise by 90 degrees, and a housing including the light source 1 is fixed to a sidewall 60.

Light that is emitted in the positive Y-axis direction from the light source 1 enters the inside of the light guiding panel 2 through the light incident end surface 21, and guided inside the light guiding panel 2 in the positive Y-axis direction through repeated total reflections between the first main surface 23 and the second main surface 24. Subsequently, the guiding direction of the light is changed at the bent part 20, and the light is guided inside the light guiding panel 2 in the negative Z-axis direction through repeated total reflections between the third main surface 25 and the fourth main surface 26.

Of the light guided inside the light guiding panel 2, the light that reaches the first light emitting part 221 is emitted from the first light emitting part 221. Also, part of the light guided inside the light guiding panel 2 is emitted from the second light emitting part 231 by the working of the light extracting part 241.

The light 223 emitted from the first light emitting part 221 can illuminate the sidewall 60, and the light 232 emitted from the second light emitting part 231 can illuminate the floor surface. For example, the light to illuminate the sidewall can provide indirect lighting and be used to illuminate a signboard or the like on the sidewall, and the light to illuminate the floor surface can be used for footlights, downlights, and the like.

Note that the location to place the lighting device 100e is not limited to a sidewall inside a building, and it is equally possible to employ a structure in which the lighting device 100e is installed on a sidewall outside a building and illuminates the sidewall surface and the ground surface.

Seventh Embodiment

Next, a lighting device 100f according to a seventh embodiment will be described. The lighting device 100f is a device that is installed on the ceiling inside a building and illuminates the ceiling surface and the sidewall surface.

Figure 17:
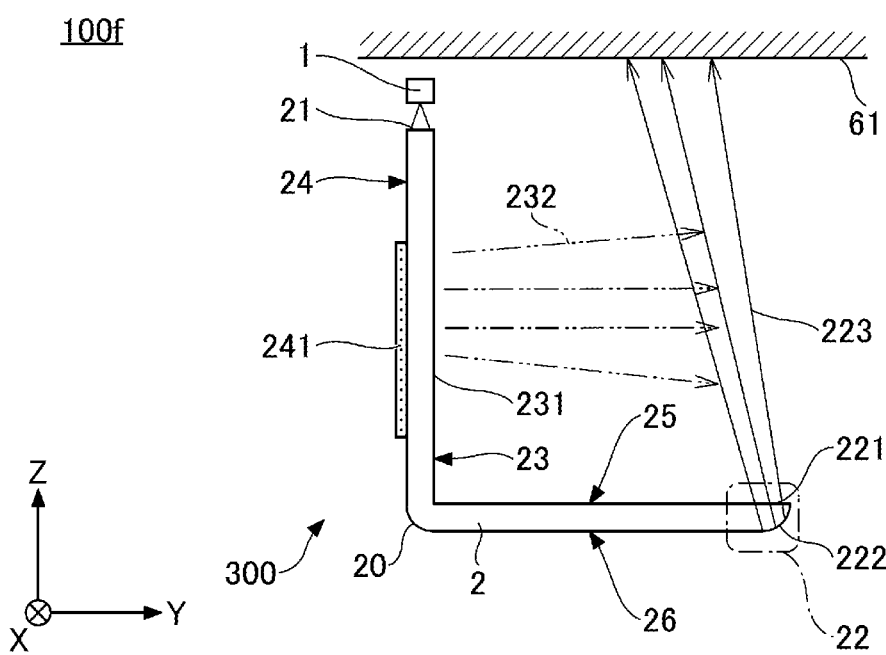
FIG. 17 is a side view that illustrates an example overall structure of a lighting device according to a seventh embodiment.

FIG. 17 is a side view that explains an example overall structure of the lighting device 100f. As illustrated in FIG. 17, the lighting device 100f has the same components as those of the desktop lighting device 100 shown in the first embodiment. In the lighting device 100f, the components included in the desktop lighting device 100 are all put upside down, and the housing including the light source 1 is fixed to the ceiling 61.

The light emitted from the light source 1 in the negative Z-axis direction enters the inside of the light guiding panel 2 through the light incident end surface 21, and is guided inside the light guiding panel 2 in the negative Z-axis direction through repeated total reflections between the first main surface 23 and the second main surface 24. Subsequently, the guiding direction of the light is changed at the bent part 20, and the light is guided inside the light guiding panel 2 in the positive Y-axis direction through repeated total reflections between the third main surface 25 and the fourth main surface 26.

Of the light guided inside the light guiding panel 2, the light reaching the first light emitting part 221 is emitted from the first light emitting part 221. Also, part of the light guided inside the light guiding panel 2 is emitted from the second light emitting part 231 by the working of the light extracting part 241.

The light 223 emitted from the first light emitting part 221 can illuminate the ceiling 61, and the light 232 emitted from the second light emitting part 231 can illuminate the sidewalls that are present in the positive Y-axis direction. For example, the light to illuminate the sidewalls can provide indirect lighting and be used to illuminate signboards or the like on the sidewalls, and the light to illuminate the ceiling can provide indirect lighting and the like.

Eighth Embodiment

Next, a lighting device 100g according to an eighth embodiment will be described. The lighting device 100g has a flat light guiding panel that includes no bent part, and is a device that illuminates the interior space, the work desk, the floor, the walls, the ceiling, and so forth.

Figure 18A:
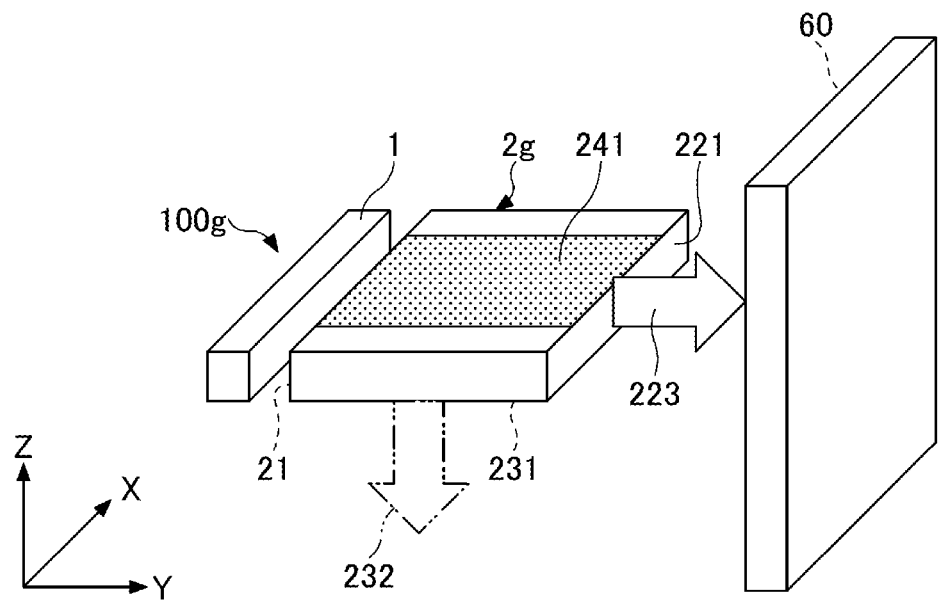
FIG. 18A is a perspective view that illustrates an example of illumination of an interior space and wall by a lighting device according to an eighth embodiment.
Figure 18B:
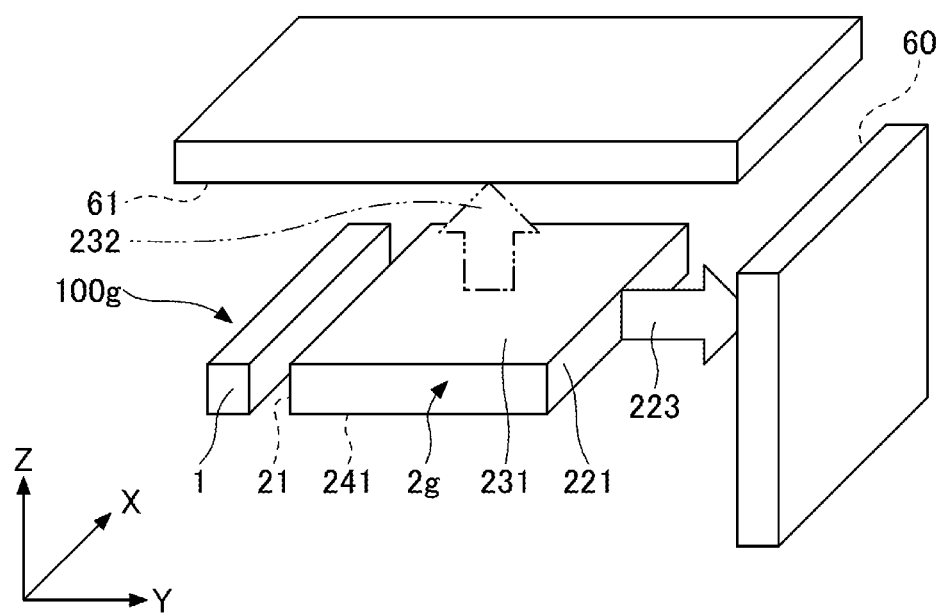
FIG. 18B is a perspective view that illustrates an example of illumination of an interior wall and ceiling by the lighting device according to the eighth embodiment.

FIG. 18A and FIG. 18B are perspective views that explain example structures of the lighting device 100g. FIG. 18A is a diagram that illustrates an example structure of the lighting device 100g that illuminates an interior space and a wall, and FIG. 18B is a diagram that illustrates an example structure of a lighting device 100g that illuminates an interior wall and ceiling of a room.

Assume that, in the structures illustrated in FIG. 18A and FIG. 18B, the lighting device 100g is fixed, via a support, to a wall that is situated in the negative Y-axis direction with respect to the lighting device 100g. Also, assume that there is a ceiling in the positive Z-axis direction with respect to the lighting device 100g, an interior space, a floor, a work desk, or the like in the negative Z-axis direction with respect to the lighting device 100g, and a wall in the positive Y-axis direction with respect to the lighting device 100g. However, the directions of the X axis, the Y axis, and the Z axis illustrated in FIG. 18A and FIG. 18B are simply for ease of explanation, and there is no particular limitation as to the orientation of the lighting device 100g upon installation. Also, the position and means for fixing the lighting device 100g are not particularly limited, and, in addition to being fixed to a wall situated in the negative Y-axis direction via a support as described above, for example, the lighting device 100g may be suspended from the ceiling, or may be fixed to the sidewall 60 via a support.

As illustrated in FIG. 18A and FIG. 18B, the lighting device 100g has a flat light guiding panel 2g without a bent part. Light emitted from the light source 1 enters the inside of the light guiding panel 2g through the light incident end surface 21 of the light guiding panel 2g, is guided inside the light guiding panel 2g in the positive Y-axis direction, and, subsequently, exits from each of the first light emitting part 221 and the second light emitting part 231.

In the structure of FIG. 18A, a light extracting part 241 is provided on a surface (opposite main surface) situated in the positive Z-axis direction with respect to the light guiding panel 2g. Part of the light guided inside the light guiding panel 2g is reflected, scattered, refracted or diffracted by the light extracting part 241, guided by the second light emitting part 231 included on a surface (predetermined main surface) situated in the negative Z-axis direction with respect to the light guiding panel 2g, and exits the light guiding panel 2g through the second light emitting part 231. The light 232 emitted from the second light emitting part 231 can illuminate the interior space, the work desk or the floor situated in the negative Z-axis direction with respect to the light guiding panel 2g.

Another part of the light guided inside the light guiding panel 2g reaches the first light emitting part 221 and exits the light guiding panel 2g through the first light emitting part 221. The light 223 emitted from the first light emitting part 221 can illuminate the sidewall 60 that is situated in the positive Y-axis direction with respect to the light guiding panel 2g.

On the other hand, in the structure of FIG. 18B, the light extracting part 241 is provided on a surface (opposite main surface) that is situated in the negative Z-axis direction with respect to the light guiding panel 2g. Part of the light guided inside the light guiding panel 2g is reflected, scattered, refracted or diffracted by the light extracting part 241, guided by the second light emitting part 231 included on a surface (predetermined main surface) situated in the negative Z-axis direction with respect to the light guiding panel 2g, and exits the light guiding panel 2g through the second light emitting part 231. The light 232 emitted from the second light emitting part 231 can illuminate the ceiling 61, situated in the positive Z-axis direction with respect to the light guiding panel 2g.

Another part of the light guided inside the light guiding panel 2g reaches the first light emitting part 221 and exits the light guiding panel 2g through the first light emitting part 221. The light 223 emitted from the first light emitting part 221 can illuminate the sidewall 60, situated in the positive Y-axis direction with respect to the light guiding panel 2g.

In this way, the lighting device 100g has a flat light guiding panel 2g, and can illuminate interior space, the work desk, the floor, the wall, the ceiling, and so forth, with the light 223 emitted from the first light emitting part 221 of the light guiding panel 2g and the light 232 emitted from the second light emitting part 231. For example, the light to illuminate the wall or the ceiling can provide indirect lighting or the like, and the light to illuminate the floor can be used for footlights, downlights, and the like.

Note that the lighting device 100g can also include the optical functional layers, low refractive index layer, cover layer, and so forth of the above-described embodiments. Furthermore, effects other than those described above are the same as the above-described embodiments.

Ninth Embodiment

Next, a lighting device 100h according to a ninth embodiment will be described. The lighting device 100h has a light guiding panel formed with a wavy surface shape (wavy shape), and is a device that illuminates interior space, the work desk, the floor, the wall, or the ceiling.

FIG. 19 is a perspective view that explains an example structure of the lighting device 100h. As illustrated in FIG. 19, the lighting device 100h has a light guiding panel 2h. The light emitted from the light source 1 enters the inside of the light guiding panel 2h through the light incident end surface 21 of the light guiding panel 2h, and is guided inside the light guiding panel 2h in the positive Y-axis direction.

Both the positive Z-axis surface and the negative Z-axis surface of the light guiding panel 2h are formed in a wavy shape. This wavy shape is, in other words, a shape having a plurality of bent parts in a predetermined direction.

A light extracting part 241 is provided on a surface (opposite main surface) situated in the positive Z-axis direction with respect to the light guiding panel 2h. Part of the light guided inside the light guiding panel 2h is reflected, scattered, refracted or diffracted by the light extracting part 241, guided by the second light emitting part 231 included on a surface (predetermined main surface) situated in the negative Z-axis direction with respect to the light guiding panel 2h, and exits the light guiding panel 2h through the second light emitting part 231. The light 232 emitted from the second light emitting part 231 can illuminate the interior space, work desk, floor, wall, ceiling, and so forth that are situated in the negative Z-axis direction with respect to the light guiding panel 2h. Also, by designing the light extracting part 241 appropriately, light can be emitted uniformly from the second light emitting part 231 even if the light guiding panel 2h is shaped wavy.

Furthermore, another part of the light guided inside the light guiding panel 2h reaches the first light emitting part 221 and exits the light guiding panel 2h through the first light emitting part 221. The light 223 emitted from the first light emitting part 221 can illuminate the interior space, work desk, floor, wall, ceiling, and so forth that are situated in the positive Y-axis direction with respect to the light guiding panel 2h.

Thus, the lighting device 100h has a light guiding panel 2h formed by including a wavy shape, can illuminate interior space, the work desk, the floor, the wall, the ceiling, and so forth, with the light 223 emitted from the first light emitting part 221 of the light guiding panel 2h and the light 232 emitted from the second light emitting part 231. For example, the light to illuminate the wall or the ceiling can provide indirect lighting or the like, and the light to illuminate the floor can be used for footlights, downlights, and the like.

By including a wavy shape in the light guiding panel 2h, it is possible to improve the design of the appearance of the lighting device 100h. In addition, the direction of the light 232 that is emitted from the second light emitting part 231 can be changed based on the wavy shape of the light guiding panel 2h, so that the lighting device 100h can provide a greater variety of lighting patterns.

Note that, although an example wavy shape having a bent part that runs along the guiding direction (Y-axis direction) of the light guided inside the light guiding panel 2h has been described with this embodiment, this is by no means limiting. It is equally possible to employ a wavy shape having a bent part that runs along a direction that intersects with the guiding direction of the light guided inside the light guiding panel 2h. Also, the direction to intersect with the guiding direction of light is not limited to the width direction (X-axis direction) that is orthogonal to the guiding direction of light in the light guiding panel 2h. Assuming a flat surface that has a light guiding direction and a width direction, directions other than the light guiding direction correspond to directions that intersect with the light guiding direction.

In addition, with the present embodiment, a sine wave shape has been shown as the wavy shape, but this is by no means limiting, and the wavy shape may be, for example, a triangular wave shape.

Also, although an example structure has been described with the present embodiment in which a wavy shape is formed over the entire opposite main surface of the light guiding panel 2h and the entire predetermined main surface of the light guiding panel 2h, this is by no means limiting. A wavy shape may be formed in at least part of the opposite main surface or in at least part of the predetermined main surface.

Also, although an example structure has been shown with the present embodiment in which the number of bent parts in the wavy shape is two, this is by no means limiting, and the wavy shape may include three or more bent parts.

Note that the lighting device 100g can also include the optical functional layers, low refractive index layer, cover layer, and so forth of the above-described embodiments. Furthermore, effects other than those described above are the same as the above-described embodiments.

Also, the directions of the X axis, the Y axis, and the Z axis illustrated in FIG. 19 are for ease of explanation, and there is no particular limitation as to the direction in which the lighting device 100h is installed.

Now, although preferred embodiments of the present invention have been described in detail above, the present invention is by no means limited to the above-described embodiments, and various changes and replacements can be applied to the above-described embodiments without departing from the scope of the present invention.

Note that, although a desktop lighting device has been described as an example with the above embodiments, this is by no means limiting, and the herein-contained embodiments can be applied to lighting devices for various purposes. The location of installation and the lighting direction of the lighting device are not limited to the above-described embodiments.

However, provided that the light emitted from the first light emitting part illuminates the hand of the worker and the light emitted from the second light emitting part illuminates a wide area on the work desk, application to a desktop lighting device is particularly preferable.

This application is based on and claims priority to Japanese Patent Application No. 2020-127344, filed with Japan Patent Office on Jul. 28, 2020, and Japanese Patent Application No. 2020-165581, filed with Japan Patent Office on Sep. 30, 2020. The entire contents of these applications are incorporated herein by reference.

REFERENCE SIGNS LIST 1 light source
11 lens (an example of an optical element)
2 light guiding panel
21 light incident end surface
22 end
221 first light emitting part (an example of a light emitting part)
221c jagged shape
222 slanted part
223 light emitted from the first light emitting part
23 first main surface (an example of a predetermined main surface)
231 second light emitting part
232 light emitted from the second light emitting part 24 second main surface (an example of an opposite main surface)
241 light extracting part
242, 246 optical cavities (examples of voids)
243, 245, 249, 251 optical functional layers
2431 first film
2432 second film
244, 247 light scattering particles
248, 252 prism parts
250, 253 jagged parts
25 third main surface
26 fourth main surface
34 low refractive index layer
35 cover layer
41 flat mirror (an example of an emitting light deflection part)
42 deflection concave mirror (an example of an emitting light deflection part)
43 large-diameter concave mirror (an example of an emitting light deflection part)
44 deflection flat mirror set (an example of an emitting light deflection part)
50 work desk surface
51 organic EL light emitting body (an example of a surface light emitting body)
52 light emitting/guiding body (an example of a surface light emitting body)
53 micro LED array light emitting body (an example of a surface light emitting body)
100 desktop lighting device (an example of a lighting device)
300 light guiding part
X X-axis direction (width direction)
Y Y-axis direction (depth direction)
Z Z-axis direction (height direction)
$d_1$, $d_2$ distance

The invention claimed is:

1. A lighting device, comprising:
a light source;
a light guiding part including a light guiding panel and configured to guide light that is emitted from the light source,
wherein the light guiding panel includes:
  a light incident end surface that is situated facing the light source, the light incident end surface being a surface on which the light emitted from the light source is incident;
  a first light emitting part that is included in an opposite end from the light incident end surface, and that emits the light guided inside the light guiding panel; and
  a second light emitting part that is included in a predetermined main surface of the light guiding panel that intersects with the light incident end surface, and that emits the light guided inside the light guiding panel; and
a light extracting part configured to guide a portion of the light inside the light guiding panel toward the second light emitting part by reflection, scattering, refraction, or diffraction, wherein the light extracting part includes an optical functional layer attached to an opposite main surface of the light guiding panel situated opposite the predetermined main surface.

2. The lighting device according to claim 1, wherein the light guiding part is transparent to visible light.

3. The lighting device according to claim 1, wherein the light guiding panel has a bent part.

4. The lighting device according to claim 1, wherein the opposite end from the light incident end surface includes at least one of:
  a curved surface;
  a slanted part slanted with respect to the predetermined main surface;
  a jagged shape configured to scatter the light; and
  a spherical part swollen in a spherical shape.

5. The lighting device according to claim 1, further comprising an emitting light deflection part configured to deflect the light emitted from the first light emitting part.

6. The lighting device according to claim 1,
wherein the light guiding part includes a low refractive index layer having a lower refractive index than the light guiding panel, and
wherein the low refractive index layer is provided in at least part of at least one of the predetermined main surface and the opposite main surface.

7. The lighting device according to claim 1, wherein, in the light extracting part, at least one of a void and a light scattering particle is provided inside the light guiding panel.

8. The lighting device according to claim 1,
wherein the optical functional layer includes at least one of a void and a light scatterer inside.

9. The lighting device according to claim 1,
wherein the optical functional layer includes at least one of a prism part and a jagged part on a surface.

10. The lighting device according to claim 1, wherein the light extracting part has at least one of a prism part and a jagged part provided on at least one of the predetermined main surface and the opposite main surface.

11. The lighting device according to claim 1, further comprising an optical element configured to diverge or converge the light, between the light source and the light incident end surface,
wherein the optical element is provided such that the optical element can move in a direction that intersects with the light incident end surface.

12. A lighting device, comprising:
a light source;
a light guiding part including a light guiding panel that is transparent to visible light, and configured to guide light that is emitted from the light source,
a surface light emitting body,
wherein the light guiding panel has:
  a light incident end surface that is situated facing the light source, the light incident end surface being a surface on which the light emitted from the light source is incident; and
  a light emitting part that is included in an opposite end from the light incident end surface, and that emits the light guided inside the light guiding panel,
wherein the surface light emitting body is provided in one of a predetermined main surface of the light guiding panel that intersects with the light incident end surface, and an opposite main surface situated opposite the predetermined main surface,
wherein the surface light emitting body is configured to emit light from a surface in a direction that intersects with the predetermined main surface, and
wherein the surface light emitting body is:
an organic electroluminescent light emitting body;
an inorganic electroluminescent light emitting body;
a light emitting/guiding body;
a micro light emitting diode array light emitting body; or
a mini light emitting diode array light emitting body.

* * * * *